United States Patent [19]

Liu et al.

[11] 4,316,360

[45] Feb. 23, 1982

[54] APPARATUS FOR RECYCLING COLLECTED EXHAUST PARTICLES

[75] Inventors: Benjamin Y. H. Liu, North Oaks; David B. Kittelson, Minneapolis; Daniel F. Dolan, St. Anthony; David Y. H. Pui, Minneapolis, all of Minn.

[73] Assignee: The Regents of the University of Minn., Minneapolis, Minn.

[21] Appl. No.: 68,703

[22] Filed: Aug. 22, 1979

Related U.S. Application Data

[63] Continuation-in-part of Ser. No. 38,077, May 11, 1979.

[51] Int. Cl.³ .............................................. F01N 3/00
[52] U.S. Cl. ........................................ 60/275; 60/279; 60/311; 55/103; 55/124; 55/DIG. 30
[58] Field of Search .................. 60/275, 278, 279, 311; 55/124, 103, DIG. 30

[56] References Cited

U.S. PATENT DOCUMENTS

| | | | |
|---|---|---|---|
| 1,756,897 | 4/1930 | Bilsky . | |
| 1,884,086 | 10/1932 | Miller . | |
| 2,100,155 | 11/1937 | Beran | 183/71 |
| 2,708,486 | 5/1955 | Hedberg | 55/124 |
| 2,771,736 | 11/1956 | McKinley | 60/275 |
| 2,862,354 | 12/1958 | Barnhart | 60/30 |
| 2,924,293 | 2/1960 | Sprague | 183/7 |
| 2,989,144 | 6/1961 | Styrie | 60/275 |
| 3,034,290 | 5/1962 | Gary | 60/30 |
| 3,034,390 | 1/1963 | O'Laughlin | 123/119 |
| 3,083,284 | 3/1963 | Raymond | 23/288 |
| 3,100,376 | 8/1963 | Potter | 60/279 |
| 3,157,479 | 11/1964 | Boles | 55/146 |
| 3,180,083 | 4/1965 | Heller | 60/29 |
| 3,184,400 | 5/1965 | Magnus | 204/193 |
| 3,184,901 | 5/1965 | Main | 55/102 |
| 3,440,800 | 4/1969 | Messen-Jaschin | 55/122 |
| 3,526,081 | 9/1970 | Kusters | 55/127 |
| 3,531,931 | 10/1970 | Caruso | 60/30 |
| 3,558,286 | 1/1971 | Gourdine | 23/288 |
| 3,618,314 | 11/1971 | Krebs | 60/30 |
| 3,620,008 | 11/1971 | Newbold | 60/30 |
| 3,755,120 | 8/1973 | Kinser | 204/164 |
| 3,936,280 | 2/1976 | Briggs | 55/3 |
| 3,976,448 | 8/1976 | Eng et al. | 60/275 |
| 3,979,193 | 9/1976 | Sikich | 55/123 |
| 3,999,967 | 12/1976 | Aoi | 60/311 |

FOREIGN PATENT DOCUMENTS

| | | | |
|---|---|---|---|
| 411807 | 9/1932 | United Kingdom | 60/275 |
| 1022714 | 3/1966 | United Kingdom | 60/275 |

OTHER PUBLICATIONS

Bertodo, R., T. W. E. Downes, and J. D. Middlemiss, "Evolution of a New Combustion System for Diesel Emission Control", SAE Paper #741131 (1974).
Wilson, R. P., Jr., E. B. Muir, and F. A. Pellicciotti, "Emissions Study of a Single Cylinder Diesel Engine", SAE Paper #740123, (1974).
Patterson, D. J., and N. A. Henein, *Emissions from Combustion Engines and Their Control*, Ann Arbor, (1972).
Pochernegg, S. J., "Efficient and Clean Diesel Combustion", SAE Paper #75087, (1975).
Walden, C. J., "Reduction of Emissions from Diesel Engines", SAE Paper #730214, (1973).
Kittleson, D. B., D. F. Dolan, R. B. Diver, and E. Aufderheide, "Diesel Exhaust Particle Size Distributions—Fuel and Additive Effects", SAE Paper #780787, (1978).
Schmidt, H. H., "Axycatalytic Scrubbers", *Canadian Mining Journal*, vol. 2, No. 10, p. 68, (Oct. 1971).
Springer, K. J., and R. C. Stahmas, "Removal of Exhaust Particulate from a Mercedes 300 Diesel Car", SAE Paper #770716, (1977).

*Primary Examiner*—Louis J. Casaregola
*Attorney, Agent, or Firm*—L. Paul Burd; Richard O. Bartz; Robert W. Gutenkauf

[57] ABSTRACT

The method and apparatus for controlling particulate emissions from a combustion apparatus, as a diesel engine. Diesel engine exhaust particles are electrically charged during the formation of the particles in the engine combustion chamber. A particle collector is used to collect the electrically charged particles on collecting structures connected to a high voltage power supply and ground. The collecting structures of the particle collector can be a plurality of parallel metal plates, spaced cylindrical rods, or concentrically located cylindrical members. A fibrous matrix can be located adjacent the particle collecting structure to collect the charged particles as they move through the matrix. In one embodiment, the collected particles separate from the collecting structures and return to the engine intake. In another embodiment, a removable collecting cartridge has electrically conductive plates for collecting the charged particles. The entire cartridge is removed for cleaning or replacement. The hot exhaust gas from the engine can be used to oxidize the collected particles. The collected particles that are not oxidized can be separated from the collecting structures and re-entrained into the gas. The re-entrained particles are larger than the particles formed in the combustion apparatus. The large particles can be removed by a downstream particle collection device or mixed with fuel for the engine.

26 Claims, 30 Drawing Figures

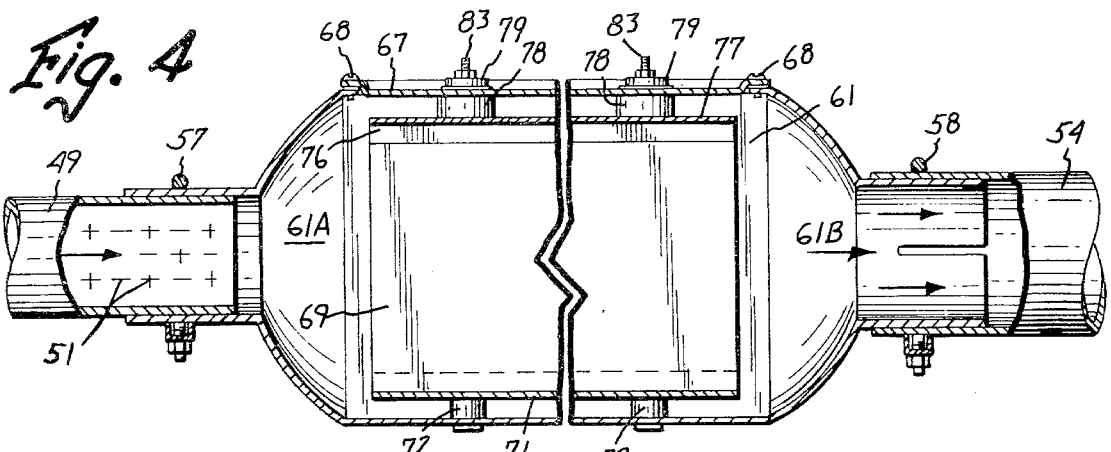
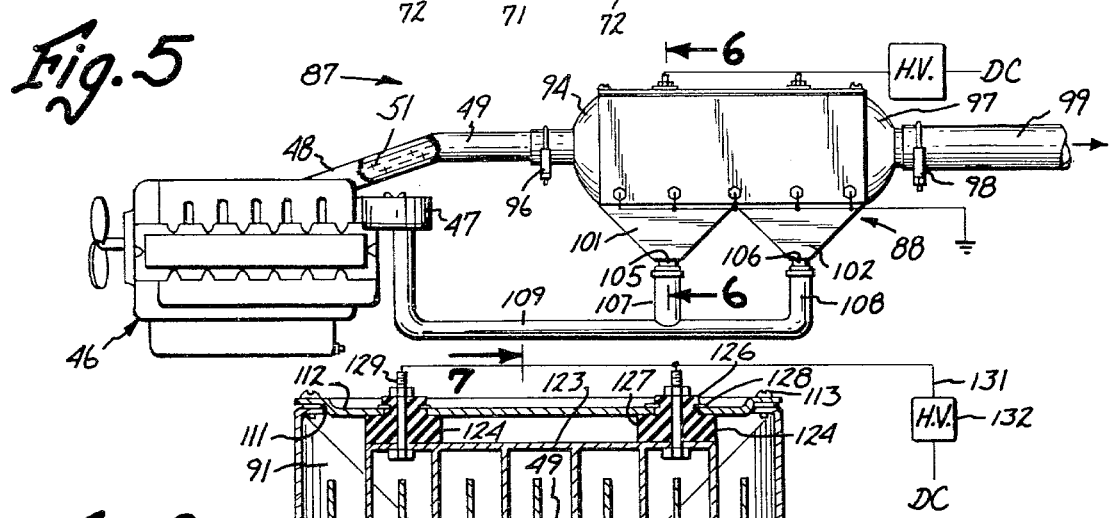
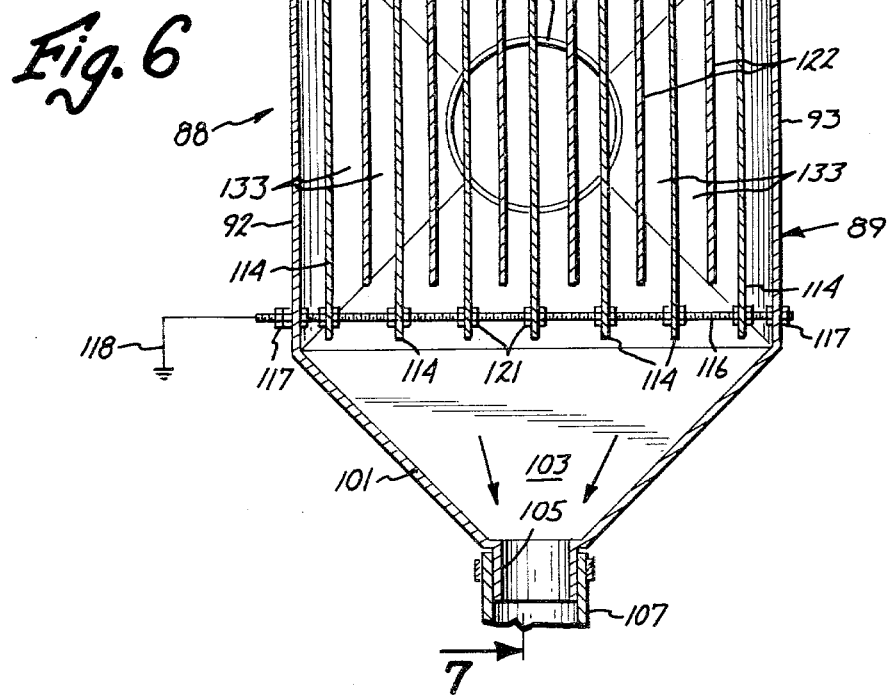

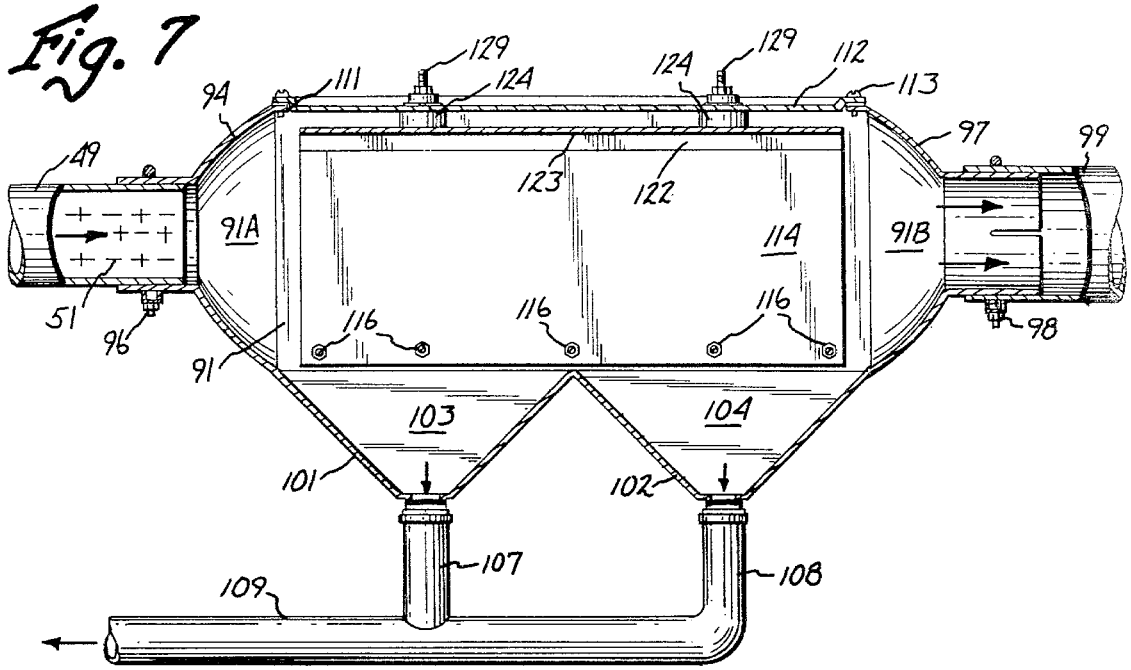
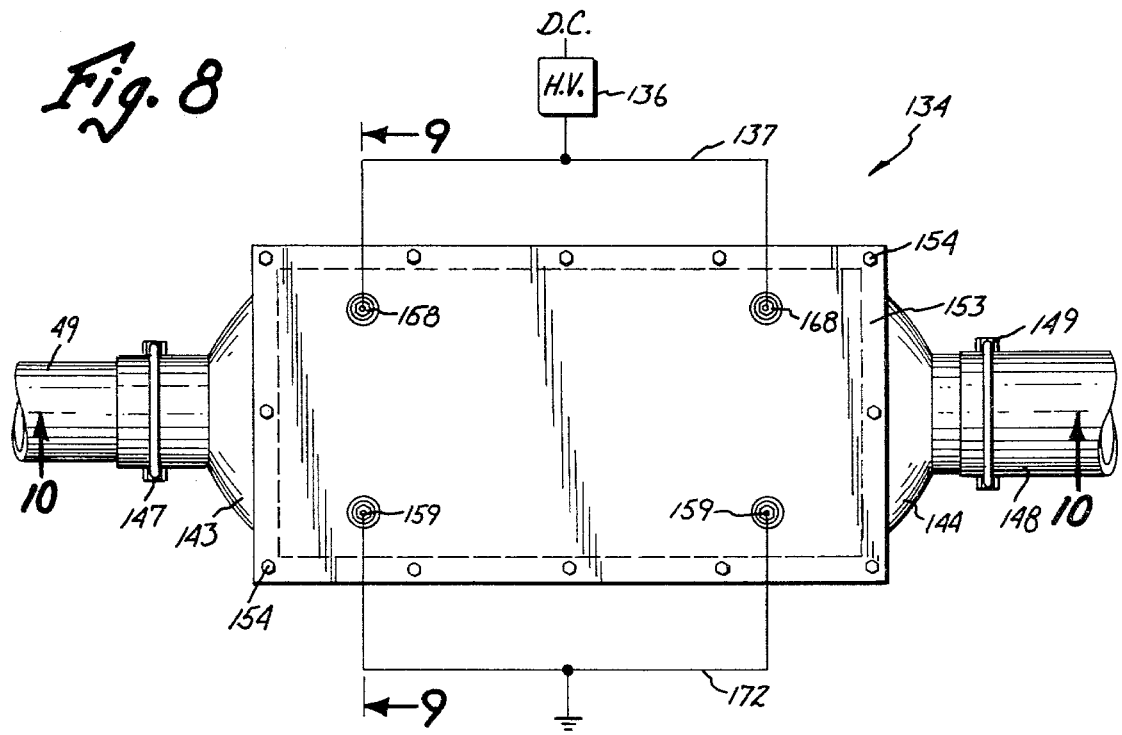

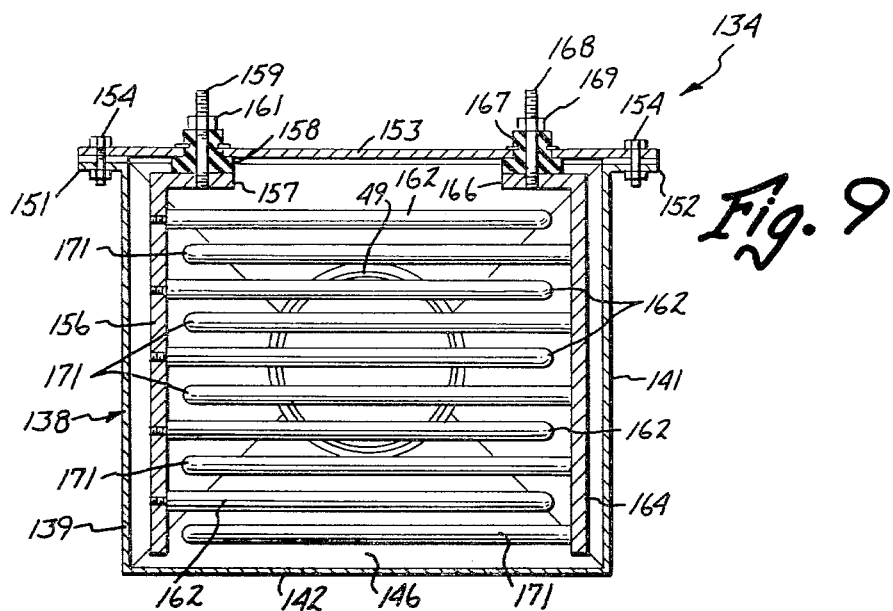
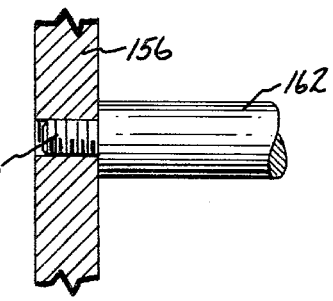
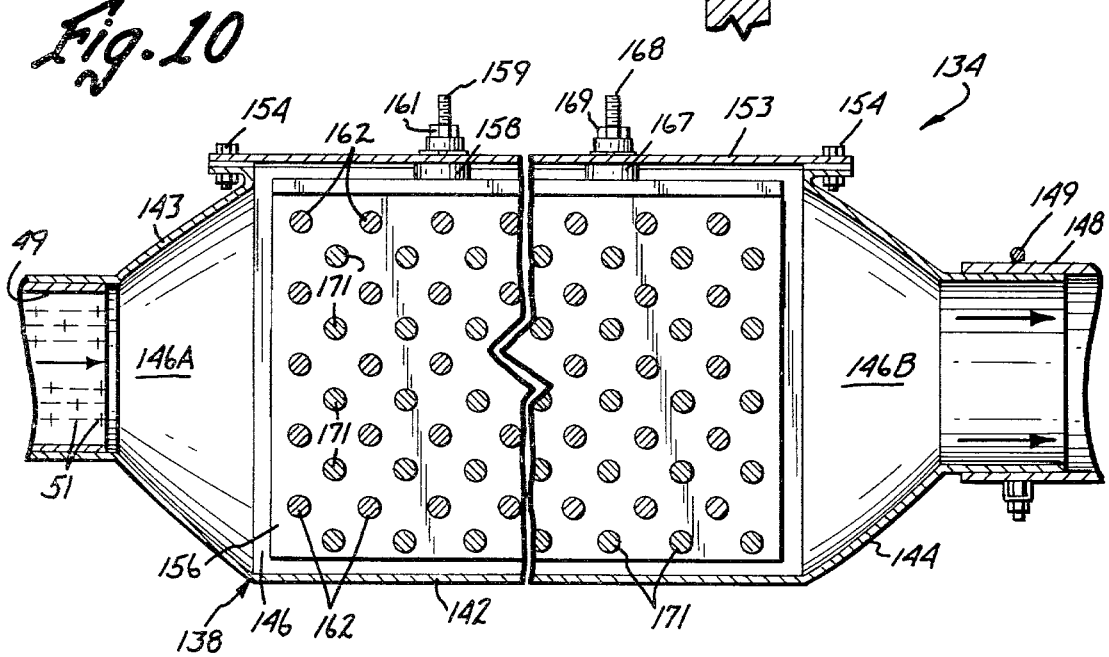

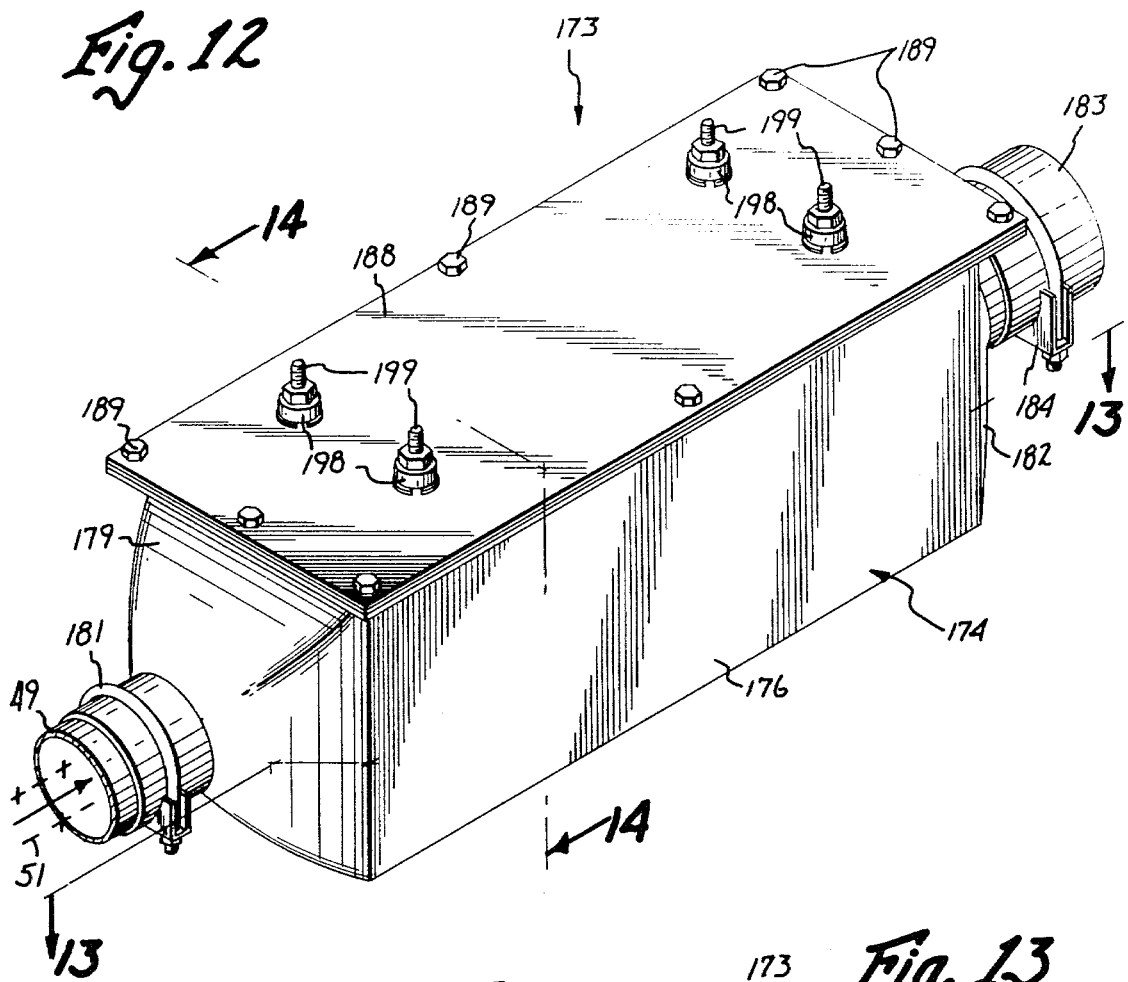
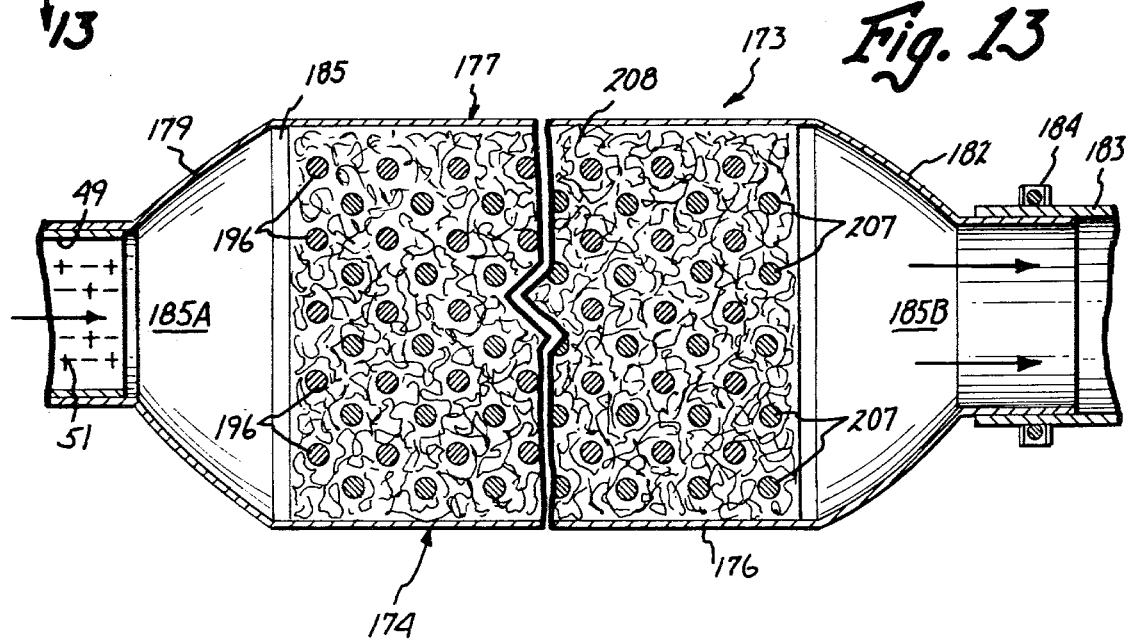

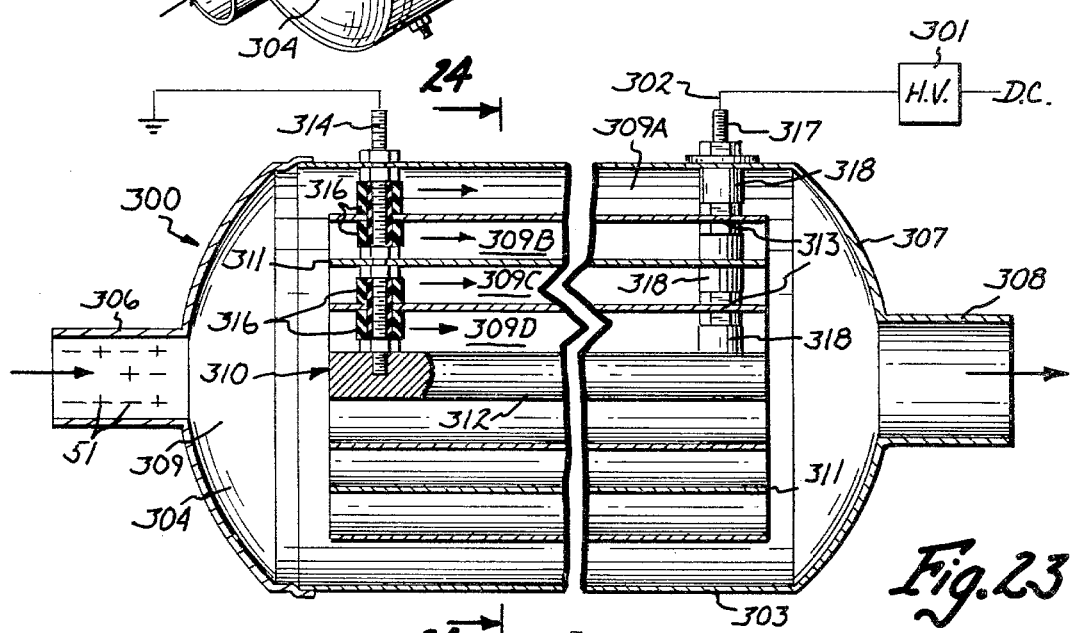

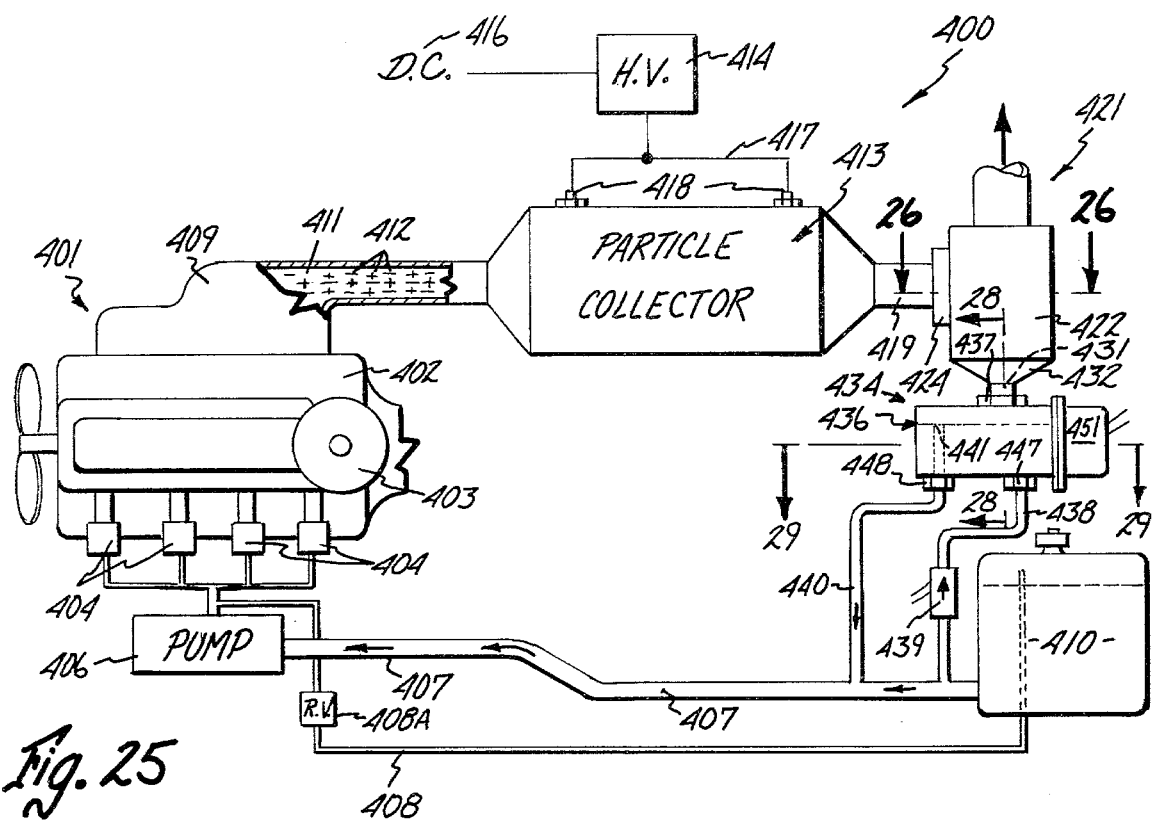
Fig. 25
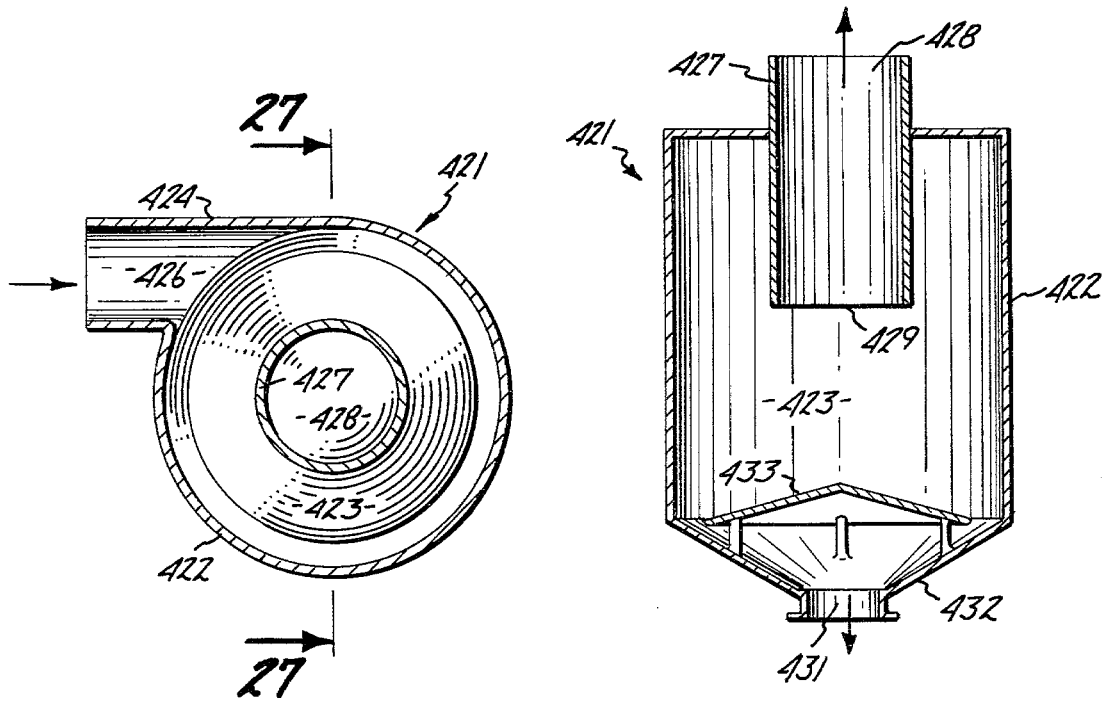
Fig. 26
Fig. 27

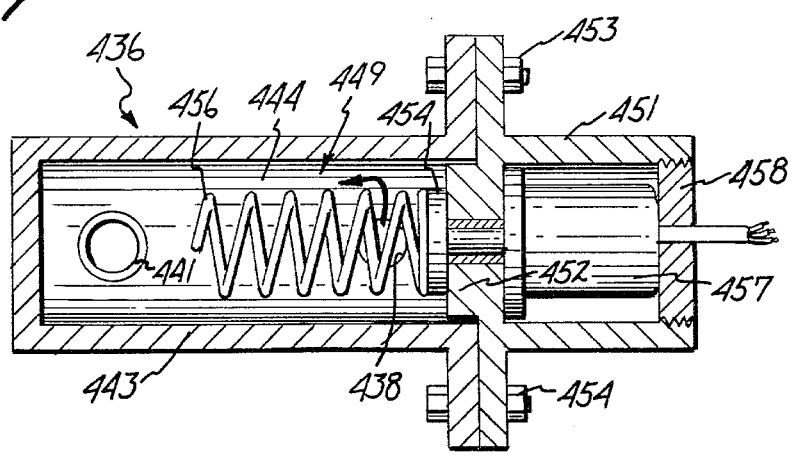
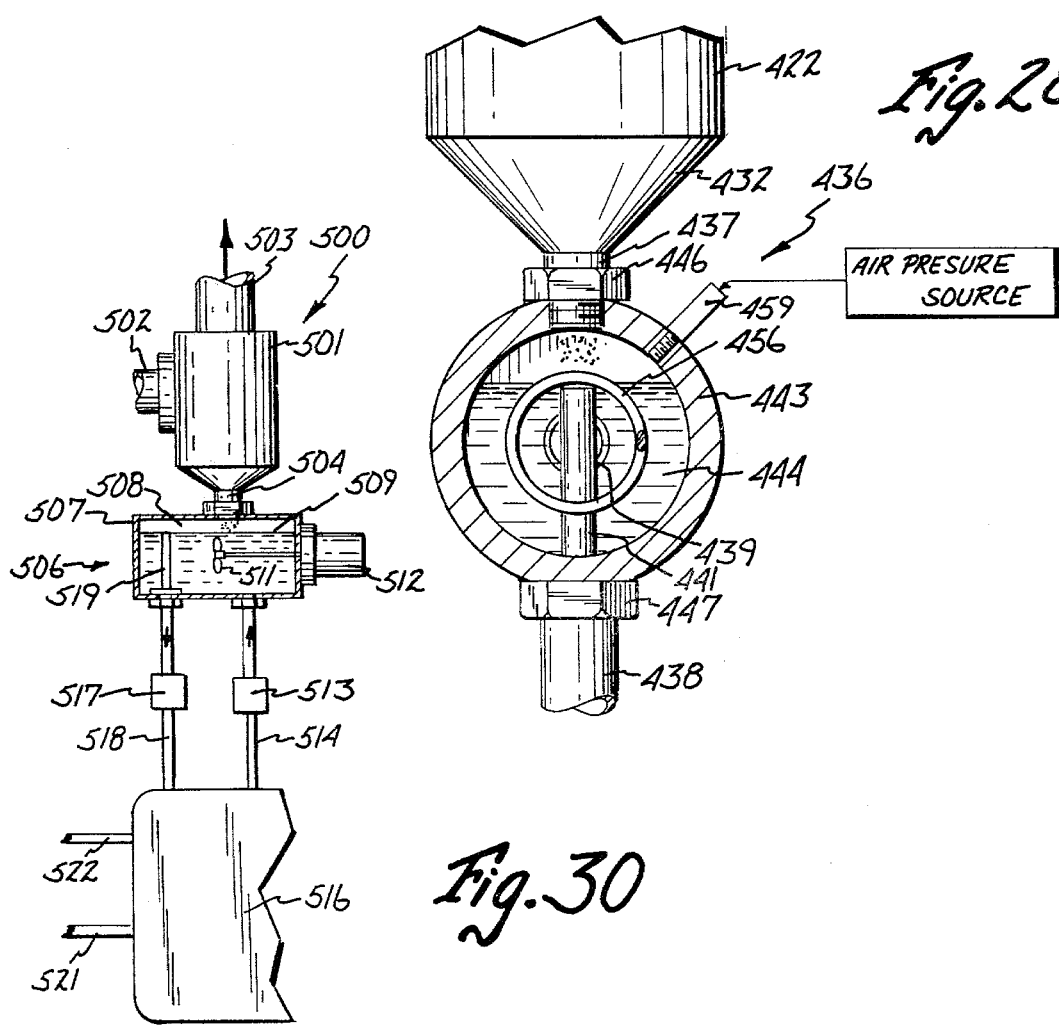

APPARATUS FOR RECYCLING COLLECTED EXHAUST PARTICLES

CROSS REFERENCE TO RELATED APPLICATION

This application is a continuation-in-part of U.S. application Ser. No. 038,077, filed May 11, 1979.

SUMMARY OF INVENTION

The invention relates to a method and means for controlling particulate emissions from a combustion system having combustion means, as a diesel engine. Diesel engine exhaust particles consist mainly of roughly spherical carbonaceous nuclei which have grown by coagulation into chain aggregates. These particles are primarily elemental carbon, but may also contain significant quantities of absorbed or condensed hydrocarbons, hydrocarbon derivatives, sulfur compounds and other materials. Similar particles are formed by other hydrocarbon combustion systems, such as oil-fired furnaces and gas turbine engines.

A property of the diesel engine exhaust particulates or particles is that a significant fraction of the particles are electrically charged during the formation of the particles in the engine combustion chambers. We have discovered that the charged particles are a high percentage of all of the exhaust particles. These particles include carbon, absorbed or condensed hydrocarbon, hydrocarbon derivatives, and sulfur compounds. Some of these particles do not carry an electrical charge. This electrical property of the diesel engine exhaust is utilized to effect particle removal by a particle collector having an electric field. Test have shown that from 72% to 88% of the particles by mass in the diesel exhaust are electrically charged. The charge distribution on the particles is nearly symmetrical. There are nearly as many positively charged particles as there are negatively charged particles, i.e., the particle charge is bi-polar. The overall charge on the particles is nearly zero and the particles as a whole are essentially an electrical neutral mass of particles.

The particle collector removes both the positive and negative charged particles. The particle collector utilizes a static electric field without a corona charging device. In the present invention, the charged particles move directly from the diesel engine to the particle collector where they are collected by the static electric field. Heat from the engine exhaust gases may be used to oxidize the collected particles. The particles that do not oxidize or are not subjected to sufficient heat to oxidize build up as particle deposits on the first and second particle collecting surface means of the collector. These deposits fracture and break off the collecting surfaces and re-entrain in the gas flowing through the collector. The re-entrained particles are larger than the submicron particles formed in the diesel engine. A collection device, as an inertial separator or scrubber, downstream of the separator is useable to remove the larger particles from the gas.

The first embodiment of the particle collector has a number of parallel metal plates. Alternate plates are connected to ground and to a source of high voltage. The exhaust gas, including the charged particles from the diesel engine, flows between the spaces between the plates. The electric field existing between the plates causes the particles to be attracted to the plate with the opposite polarity whereby the particles are collected on the plate.

In a second embodiment of the particle collector, a collecting passage for particles is located below the plates. The deposited particles fall into the collecting passage and are fed back into the intake of the engine. The advantage of this arrangement is that accumulated particles are returned to the engine thereby reducing the need to service and clean the collection plates. Part of the exhaust gases are also returned to the engine intake. The recirculation of exhaust gases controls $NO_x$ emissions.

In the third embodiment of the particle collector, the particle collecting means has a housing with a chamber accommodating a plurality of cylindrical rods. Each rod has an outer particle collecting surface. Alternate rods are connected to a high voltage power supply and ground to establish an electric field between adjacent rods. The charged particles flowing through the electric field are collected on the outer surfaces of the rods. Support means locate the rods in the housing chamber. The support means can be removed from the housing whereby the rods can be cleaned and repaired.

In a fourth embodiment of the particle collector, the chamber through which the particulate matter and exhaust gases flow is filled with a fibrous matrix, such as a plurality of filaments or fibrous elements. The charged particulate matter moves through the fibrous matrix and is deposited on the fibers and collector rods by the electric field. The advantage of this method is that the particles travel only a short distance before they are collected. The fibrous matrix is periodically removed and new fibrous matrix is installed.

In a fifth embodiment of the particle collector, a removable collecting cartridge is located within the collecting chamber. The cartridge has alternate electrically conductive plates which, when subjected to electric power, establishes the electric field for collecting the charged particulate matter. The entire cartridge can be removed from the collector for cleaning or replacement.

In the sixth embodiment of the particle collector, the particle collecting means are elongated cylindrical members that are concentrically located relative to each other to provide an electric field through which the particles flow. The cylindrical members are alternately connected to ground and to a source of high voltage. Each collector can be placed close to the engine and kept hot by thermo-insulation or other means. The particles collected on the plate, rods or cylindrical members are oxidized whereby the collector members are self-cleaning.

The method for controlling the amount of particulate matter discharged into the ambient air by a diesel engine or like combustion apparatus comprises the imparting of an electric charge on the particulate matter formed in the combustion area or chamber during the combustion of hydrocarbon fuel in the diesel engine. The diesel engine may have a plurality of combustion chambers receiving air and hydrocarbon fuel, i.e., diesel oil. Particles are electrically charged or imparted with an electrical charge during the formation of the particles in the combustion chambers of the diesel engine. The particle charge is bipolar or both positive and negative. The charged particles, along with the hot exhaust gases of the diesel engine, are moved to a particle collector having particle matter collecting means. An electric field is established within the particle collector by applying a voltage to part of the collecting means. The voltage can be a D.C. voltage. Typically, several thousand volts are needed, the exact voltage being dependent upon the engine and collector size. The charged particles, along with exhaust gases, flow into the electric field. The charged particles are collected on the collecting means. The collected particles can be oxidized by exhaust gas heat from the engine. The collector can be located close to the engine and kept hot by thermo-insulating means. Oxidation of the collected particles makes the device self-cleaning. The applied electric field functions to deposit the particles on the collection surfaces for subsequent oxidation by exhaust gas heat from the engine.

The uncharged particles and exhaust gases flow through the electric field and are discharged to the atmosphere or to a catalytic converter. During the operation of the collector, deposits of particles are built up on the collection surfaces. These deposits will fracture from time to time. The resulting particles will either be re-entrained or fall to the bottom of the collector. The re-entrained particles are much larger than the sub-micron particles originally collected. The larger particles are easily removed by an inertial separator, scrubber, or other collection devices downstream of the collecting means. In some applications, the scrubber can be a water scrubber operable to cool exhaust gases, as well as collect the larger particles. The collected larger particles can be directed to a particle transfer and mixing unit that mixes these particles with the fuel for the engine.

IN THE DRAWINGS:

FIG. 4 is an enlarged foreshortened sectional view taken along the line 4—4 of FIG. 2;

FIG. 5 is a side elevational view of a second modification of a means employing the method and apparatus of the invention for reducing the amount of particles emitted by a diesel engine into the atmosphere;

FIG. 6 is an enlarged sectional view taken along the line 6—6 of FIG. 5;

FIG. 7 is a sectional view taken along the line 7—7 of FIG. 6;

FIG. 8 is a top plan view of a third modification of a means employing the method and apparatus of the invention for reducing the amount of particles emitted by a combustion system into the atmosphere;

FIG. 9 is an enlarged sectional view taken along the line 9—9 of FIG. 8;

FIG. 10 is an enlarged foreshortened sectional view taken along the line 10—10 of FIG. 8;

FIG. 11 is an enlarged sectional view of a portion of FIG. 9 showing the connection between a rod and rod support plate;

FIG. 12 is a perspective view of a fourth modification of a particle collector useable with the means employing the method and apparatus of the invention for reducing the amount of particles emitted by a combustion system into the atmosphere;

FIG. 13 is an enlarged foreshortened sectional view taken along the line 13—13 of FIG. 12;

FIG. 22 is a perspective view of a fifth modification of a particle collector useable with the means employing the method and apparatus of the invention for reducing the amount of particles released by a combustion system into the atmosphere;

FIG. 23 is an enlarged, foreshortened, and longitudinal sectional view of the collector of FIG. 22;

FIG. 24 is a sectional view taken along the line 24—24 of FIG. 23;

FIG. 25 is a diagrammatic view of another means employing the method and apparatus of the invention for collecting particles exhausted from a combustion process and recycling the particles into the fuel used in the combustion process;

FIG. 26 is an enlarged sectional view taken along line 26—26 of FIG. 25;

FIG. 27 is a sectional view taken along line 27—27 of FIG. 26;

FIG. 28 is an enlarged sectional view taken along line 28—28 of FIG. 25;

FIG. 29 is an enlarged sectional view taken along line 29—29 of FIG. 25; and

FIG. 30 is a diagrammatic view of a modification of the method and apparatus of FIG. 25.

DESCRIPTION OF PREFERRED EMBODIMENTS

Figure 1:
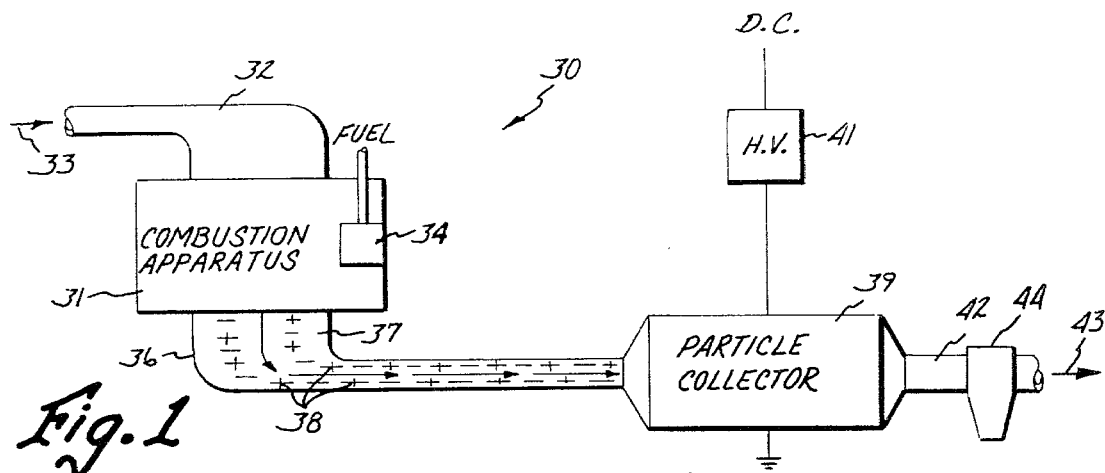
FIG. 1 is a diagrammatic view of a means employing the method and apparatus of the invention for reducing the amount of particles emitted by a combustion system into the atmosphere.

Referring to FIG. 1, there is shown a diagrammatic view of the means indicated generally at 30 employing the method and apparatus of the invention for educing the amount of particulate matter or particles established as a result of combustion or hydrocarbon fuel into the atmosphere. A combustion apparatus 31, as a diesel engine, has an air intake structure 32 operable to direct air, indicated by arrow 33, to the combustion chamber or chambers of apparatus 31. A fuel supply unit 34 functions to introduce fuel to the combustion chamber of combustion apparatus 31. The combustion process produces heat, gases, and particles, as well as output energy. The particulate matter or particles are electrically charged as a result of their formation process. In other words, the electrical charge is established or imparted during the formation of the particles in the combustion process. The combustion of fuel, as hydrocarbon fuel, includes thermic oxidation or the air-fuel mixture. During this oxidation process, particles are formed and electrical charges are generated along the flame front of the burning fuel. The electrical charges are associated with a majority of the particles. The particle charge is bi-polar or both positive and negative. The exhaust gases and particles are discharged from combustion apparatus 31 through exhaust structure 36, as an exhaust manifold, having a passage 37. The particulate matter is shown as positive and negative charged particles 38. The charged particles 38, along with the gases in passage 37, flow to a particle collector 39. Particle collector 39 is a precipitator employing a static electric field powered by high voltage power supply 41. High voltage power supply 41 is a conventional high voltage solid state encapsulated module powered by a 12 volt D.C. power source and has an output of several thousand volts. Other types of high voltage power supplies and output voltage can be used to provide collector 39 with high voltage power. The charged particles 38, as they move through an electric field in collector 31, are deposited on collector structures, as plates, rods, sleeves, and the like. Particle collector 39 is in direct communication with exhaust structure 36 so that it receives hot gases along with the charged particles from combustion apparatus 31.

Collector 39 can be located close to exhaust structure 36 to minimize charge leak-off from the charged particles and to insure that it receives maximum heat of the exhaust gases. Thermo-insulation can be used to prevent dissipation of heat from the exhaust structure 36 and tubular means connecting the exhaust structure to the particle collector 39.

The collected particles that accumulate on the collector structures oxidize and form mostly $CO_2$. The oxidation of the collected particles makes the collector self-cleaning. The cleaned gases are discharged from collector 39 through an exhaust discharge pipe 42. The exhaust gases 43 can be discharged into the atmosphere.

In another mode of operation, deposits of particles are built up on the collecting structures of collector 39. Electrostatic and adhesion forces and particle affinity retain the particles on the collecting structures. The deposits of particles will fracture or break loose and re-entrain in the moving gases or fall to the bottom of collector 39. Re-entrained particles are much larger than the sub-micron charged particles originally collected. These larger particles can be readily removed by a second particle collection device 44, as an inertial separator, scrubber, or cyclone separator located downstream of collector 39. For example, a water scrubber can be used with collector 39 to collect the re-entrained particles and cool the exhaust gases discharged into the atmosphere.

Figure 2:
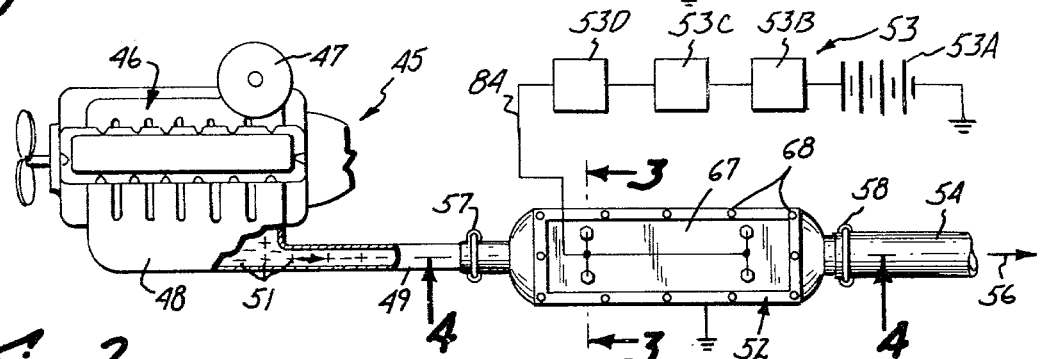
FIG. 2 is a diagrammatic plan view of a diesel engine connected to a first particle collector.

Referring to FIG. 2, there is shown first means 45 employing the method and apparatus of the invention for reducing particulate matter or particles emitted by an internal combustion engine 46. Engine 46 is a diesel engine having an air intake unit 47 and an exhaust manifold 48. Conventional fuel injectors for introducing hydrocarbon fuels to the combustion chambers are part of engine 46. Exhaust manifold 48 is connected to an exhaust pipe or conduit 49 which carries the discharged gases and charged particles 51 to a particle collector indicated generally at 52.

Diesel engine exhaust particles consist mainly of roughly spherical carbonaceous nuclei which have grown by coagulation into chain aggregates. These particles are primarily elemental carbon, but may also contain significant quantities of absorbed or condensed hydrocarbons, hydrocarbon derivatives, sulfur compounds and other materials.

The particles emitted by diesel engine 46, as a whole, are substantially neutral. The cloud of particles is neutral, as there are about as many positively charged particles as there are negatively charged particles. It has been determined that the individual particles in the cloud carry a significant electrical charge. A significant fraction of the particles emitted from diesel engine 46 are electrically charged. The charge distribution is substantially symmetrical and there are as many positively charged particles as there are negatively charged particles. The combustion of the hydrocarbon fuel injected into the compressed air in a cylinder or combustion chamber in a diesel engine is a complex process. It includes thermic oxidation along the flame front that moves across the combustion chamber. The particles are formed along the flame front and electrical charges are generated. The electrical charges are positive and negative and are associated with a majority of the particles. Tests of diesel engines have shown that from 72% to 88% of the particles by mass in the exhaust were electrically charged. The charge distribution was nearly symmetrical. There were as many positively charged particles as there were negatively charged particles. The percentage of particles that were electrically charged under different engine load conditions varied. At idel, the percentage was about 72%. At full load, the percentage was about 88%. The particles were found to become charged as a result of the combustion process occurring within the engine.

Particle collector 52 is a static electric field precipitator powered by high voltage power supply 53. A high voltage power supply 53 of several thousand volts is coupled to a D.C. power source 53A. Power supply 53, connected to a 12-volt battery 53A, includes an inverter 53B, a step-up transformer 53C, and a rectifier 53D. Power supply 53 can be connected to the D.C. battery of a vehicle, as a car or truck. The voltage output of power supply 53 can vary in accordance with the requirements of the particle collecting process. For example, voltages as low as 100–200 volts or as high as 10,000 or more volts can be used. The voltages will vary with the size and type of diesel engine and particle collector, as well as the rate of flow of particles into the collector.

Collector 52 has first and second particle collecting surface means or electrodes that are spaced from each other and connected to the high voltage power supply and ground, respectively. A gas exhaust or discharge pipe 54 is connected to the outlet end of collector 52 to carry the emissions and the gases to a muffler or catalytic converter. A clamp 58 secures pipe 54 to collector 52. Collector 52 operates to collect the particles on the first and second particle collecting surface means. The particles build up on the surface means. Electrostatic and adhesion forces and particle affinity forces retain the particles on the surface means and particles collected on the surface means. In time, the build up of particles on the surface means will fracture or break loose and re-entrain in the gas moving through collector 52. The re-entrained particles are much larger in size than the sub-micron charged particles originally formed in the diesel engine combustion chambers. The large particles are readily removed by a particle collection device 44, as an inertial separator or scrubber, located downstream of collector 52. The collection device 44 is a secondary collection apparatus that can be a water scrubber operable to collect the large particles and cool the exhaust gases.

Figure 3:
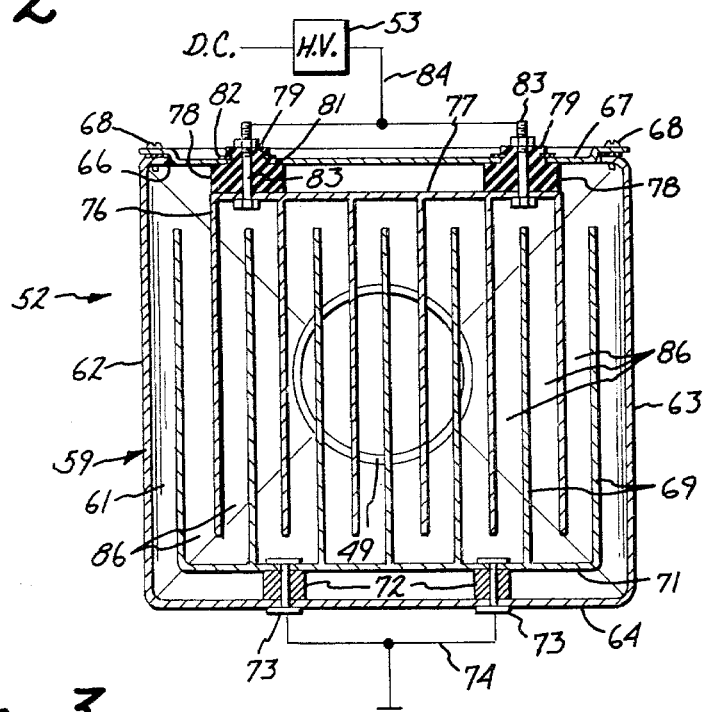
FIG. 3 is an enlarged sectional view taken along the line 3—3 of FIG. 2.

Referring to FIGS. 3 and 4, particle collector 52 has an elongated box shaped housing or casing 59 defining an elongated chamber 61. Chamber 61 has a cross section size larger than the cross section of pipe 49. Housing 59 comprises generally upright flat side walls 62 and 63 joined to a bottom wall 64. The top of housing 59 has an elongated opening 66 closed with a cover 67. A plurality of fasteners, as bolts 68, secure cover 67 to top portions of side walls 62 and 63. Bolts 68 can be removed so that the cover and structures attached to the cover can be separated from housing 59.

A plurality of longitudinal upright first electrodes or plates 69 are located in chamber 61. The bottom edges of plates 69 are secured to a flat horizontal base or plate 71. Plates 69 are located in side-by-side spaced relation and extend from base 71 upwardly toward cover 67. Base 71 is mounted on a plurality of blocks 72 which space the plate 71 above bottom wall 64. A plurality of fasteners 73 extended through blocks 72 secure base 71 to bottom wall 64. A line or electrical conductor 74 connects fasteners 73 and plate 71 to ground.

A plurality of second electrodes or plates 76 are located in chamber 61. Plates 76 are generally flat rectangular members positioned between adjacent plates 69. Plates 76 are attached to and extend downwardly from a flat top or support 77. A plurality of blocks 78 of electrically insulative material, as glass, plastic, and the like, space plate 77 from cover 67. Blocks 78 have upwardly directed cylindrical bosses 79 that project through holes 81 in cover 67. C-clips 82 surround bosses 79 to secure blocks 78 to cover 67. Other types of fastening structure, as nuts, pins, and clamps, can be used to attach blocks 78 to cover 67. Electrically conductive bolts 83 extend through blocks 78 and mount plate 77 on blocks 78. An electrically conductive line 84 connects bolts 83 to the high voltage power supply 53.

Plates 76 are spaced an equal distance from the adjacent first plates 69. The ends of plates 76 are spaced from base 71. The upper ends of plates 69 are spaced below plate 77. The spaces between the adjacent sides and ends of the plates 69 and 76 are substantially equal.

As shown in FIG. 3, there are seven upwardly directed first plates 69 and six downwardly directed second plates 76. Second plates 76 are located between adjacent first plates 69. The plates 69 and 76 are metal electrical conductive members, such as stainless steel, aluminum, and the like, having generally flat particle collecting surfaces. Plates 69 and 76 can be made of any corrosive resistant electrically conductive material, including, but not limited to, metal, conductive ceramic, electrically conductive plastic, and plastic coated with an electrically conductive skin. The number and size of the plates 69 and 76 can vary. The six and seven plate arrangement shown in FIG. 2 is by way of example and not intended to limit the number, nor the size, of the particle collecting means having the particle collecting surfaces.

Referring to FIG. 4, charged particles 51 flow through exhaust pipe 49 into an inlet or vestibule 61A of large chamber 61. The velocity of the gas and particles is decreased because of the increased size of chamber 61. The gas and particles entrained in the gas flow through spaces 86 between adjacent plates 69 and 76. The high voltage power source 53, supplying several thousand volts to the plates, establishes an electric field between adjacent plates 69 and 76. The charged particles 51 flowing through spaces 86 are attracted to and are collected on the surfaces of plates or electrodes 69 and 76 thereby removing the charged particles from the gas. The gas flows through outlet section 61B of chamber 61 into the exhaust pipe 54.

Particle collector 52 can be located close to the engine. Exhaust pipe 49 can be short and thermo-insulated so that the collector will receive hot gases and charged particles directly from the engine. The collected particles that accumulate on the particle collecting surfaces, when heated, will oxidize and form mostly $CO_2$. The oxidation of the collected particles makes the collector self-cleaning. The electric field in collection 52 is used to deposit the particles on the particle collection surfaces. The heat subsequently oxidizes the collected particles.

Referring to FIGS. 5–8, there is shown a second modification of the means indicated generally at 87 employing the method and apparatus of the invention for reducing the amount of particulate matter emitted from a diesel engine 46. Engine 46 has an exhaust structure 48 for carrying charged particles 51 and gas to a particle collector indicated generally at 88. Collector 88 has an elongated housing or casing 89 surrounding an elongated particle collection chamber 91. Housing 89 has a pair of upright side walls 92 and 93 joined to an inlet wall 94 and an outlet wall 97. A clamp 96 secures a portion of wall 94 to the exhaust member 49. A second clamp 98 attaches discharge pipe 99 to a portion of outlet wall 97.

A pair of downwardly directed hoppers 101 and 102 are connected to the lower edges of side walls 92 and 93. Hoppers 101 and 102 converge downwardly and are open to the particle collection chamber 91. Hoppers 101 and 102 surround particle receiving passages 103 and 104 which are in communication with passages in downwardly directed necks 105 and 106. A pair of short tubes 107 and 108 are mounted on necks 105 and 106, respectively. Tubes 107 and 108 are joined to an elongated return tube or pipe 109. As shown in FIGS. 5 and 7, return pipe 109 connects passages 103 and 104 of hoppers 101 and 102 to air intake 47 of diesel engine 46. Thus, particle from collector 88 and a limited amount of gas are recycled or fed back to the intake 47 of diesel engine 46.

Housing 89 has a generally rectangular top opening 111 that is normally closed with a cover 112. A plurality of fasteners 113, as bolts or screws, secure cover 112 to side and end walls 92, 93, 94, and 97. Fasteners 113 can be removed so that cover 112 and structure secured to cover 112 can be separated from the housing for cleaning and repair.

Charged particle collecting means comprising a first plurality of collector electrodes or plates 114 having particle collecting surfaces are located in chamber 91. As shown in FIG. 6, plates 114 are located in parallel side-by-side positions and mounted on a plurality of transverse rods 116. The spaces between adjacent plates 114 are open and in communication with passages 103 and 104 of hoppers 101 and 102. Nut and bolt assemblies 117 secure rods 116 to the bottom parts of side walls 92 and 93. Additional nuts 121 threaded on rods 116 engage opposite sides of each of the plates 114 to position the plates on rods 116. Other structures can be used to locate and secure plates 114 to rods 116 or housing side walls 92 and 93. An electrical conductor or line 118 connects the rods 116 and plates 114 to the ground.

A plurality of second electrodes or plates 122 having particle collecting surfaces are located in chamber 91 and between adjacent plates 114. Second plates 122 extend downwardly from and are attached to a generally horizontal support 123. A plurality of electrically insulative blocks 124 space support 123 from cover 112 and locate the plates 122 in the spaces between adjacent first plates 114. Blocks 124 have upright bosses 126 which project through holes 127 and cover 112. C-clips 128 associated with bosses 126 secure blocks 124 to the cover 112. Other types of structures can be used to attach blocks 124 to cover 112. Each block accommodates a bolt 129 which secures the support 123 to the blocks 124. Bolts 129 also function as electrical conductors to connect plates 122 to a line or conductor 131 leading to a high voltage power supply 132, similar to power supply 53. Power supply 132 is connected to a source of electrical power, as a D.C. battery.

In use, the particles and gases, including the charged particles 51, flow into the inlet or vestibule portion 91A of chamber 91. The gas and particles flow through spaces 133 between the adjacent plates 114 and 122. The high voltage power supply 132 establishes an electrical field between the adjacent plates 114 and 122. The charged particles are collected on the surfaces of plates 114 and 122. The collected or accumulated particles tend to agglomerate or merge. Electro-static and adhesion forces and particles affinity forces retain the collected particles on plates 114 and 122. The larger groups of particles flake off or separate from the plates 114 and 122 because of vibration of the collector 88 and movement of gases between adjacent plates 114 and 122. Other means, as periodic reverse polarity of the power supply, can be used to separate the collected particles from the plates 114 and 122. The merged particles that are separated from plates 114 and 122 fall into hopper passages 103 and 104. The inlet air intake 47 of the engine draws the particles and part of the gases through tube 109 back into the air intake of engine 46. The particles flow back into the engine combustion chambers. The gases and uncharged particles flow from collector 88 through outlet chamber section 91B and the passage and discharge pipe 99. The gases can be delivered to a catalytic converter, secondary collector, or the atmosphere.

Referring to FIGS. 8-10, there is shown a third modification of the particle collector indicated generally at 134. A high voltage power source 136, similar to power source 53, is connected with line 137 to collector 134. Collector 134, as shown in FIG. 9, has an elongated generally box shaped housing or casing 138 comprising a pair of upright side walls 139 and 141. The side walls 139 and 141 are joined to a flat bottom wall 142, an inlet end wall 143, and an outlet end wall 144. The walls 139, 141, 142, 143, and 144 surround a particle collection chamber 146. The charged particles and exhaust gases are delivered to chamber 146 from engine 46 through discharge conduit or pipe 49. A clamp 147 attaches a portion of inlet end wall 143 to pipe 49. The outlet end wall 144 is joined to a discharge tube 148. A clamp 149 surrounds tube 148 to secure tube 148 to a portion of discharge outlet end 144.

The top edges of side walls 139 and 141 have outwardly directed flanges or lips 151 and 152, respectively. A flat cover 153 closes the open upper end of housing 138 and rests on lips 151 and 152. A plurality of fasteners 154, as nut and bolt assemblies, attach cover 153 to lips 151 and 152.

A first longitudinal plate 156 is located in chamber 146 adjacent the inside of wall 139. Plate 156 has an inwardly directed upper flange or top flange 157. Flange 157 engages a plurality of electrically insulative blocks 158 mounted on top wall 153. The blocks 158 accommodate bolts 159 carrying nuts 161. Bolts 159 are attached to flange 157 to secure the flange 157 to blocks 158. Plate 156 carries a plurality of rows of horizontal first electrodes or rods 162. The rods 162 are cylindrical members having particle collecting surfaces and extend from plate 156 toward a second plate 164 located adjacent the inside of side wall 141. Referring to FIG. 11, rod 162 has a threaded end 163 threaded into an opening in plate 156. The rod 162 can be attached with other means to plate 156.

Second plate 164 has an inwardly directed top flange 166 spaced from the inside of cover 153 with a plurality of electrically insulative blocks 167. Blocks 167 are mounted on or attached to cover 153. Bolts 168 extended through blocks 167 are attached to flange 166. Nuts 169 threaded onto bolts 168 hold flange 166 and blocks 167 in assembled relation. Plate 164 carries a plurality of rows of second electrodes or rods 171. The rods 171 located parallel to rods 162 have particle collecting surfaces and are spaced in rows that are intermediate the rows of rods 162. The rectangular pattern of the rods 162 and 171 are equally spaced from each other so that there is a substantially equal electrical field between the rows of rods 162 and 171. Plate 156 is connected with a line 172 to ground. Line 137 from high voltage power source 136 is connected to plate 164 via the volts 168. High voltage power source 136 operates to establish an electrical field between the adjacent rows of rods 162 and 171. The charged particles 51 flow through passage 146 and through the electric field between the adjacent rows of rods 162 and 171. The charged particles are collected on the particle collecting surfaces of rods 162 and 171. Electro-static and adhesion forces and particle affinity forces retain the collected particles on rods 162 and 171. The exhaust gas and neutral particles flow through the outlet region 146B of the chamber and through the passage of discharge pipe 148. Heat from the engine can oxidize the particles collected on the particle collecting surfaces of rods 162 and 171.

Cover 153 is removable from housing 138 by removing nut and bolt assemblies 154. When cover 153 is removed, both plates 156 and 164, along with rods 162 and 171 attached thereto, are removed from the housing. Plates 156 and 164 and rods 162 and 171 can be cleaned of particles. The cleaned rods and plates 156 and 164 are returned to the chamber 146 as a unit.

Figure 14:
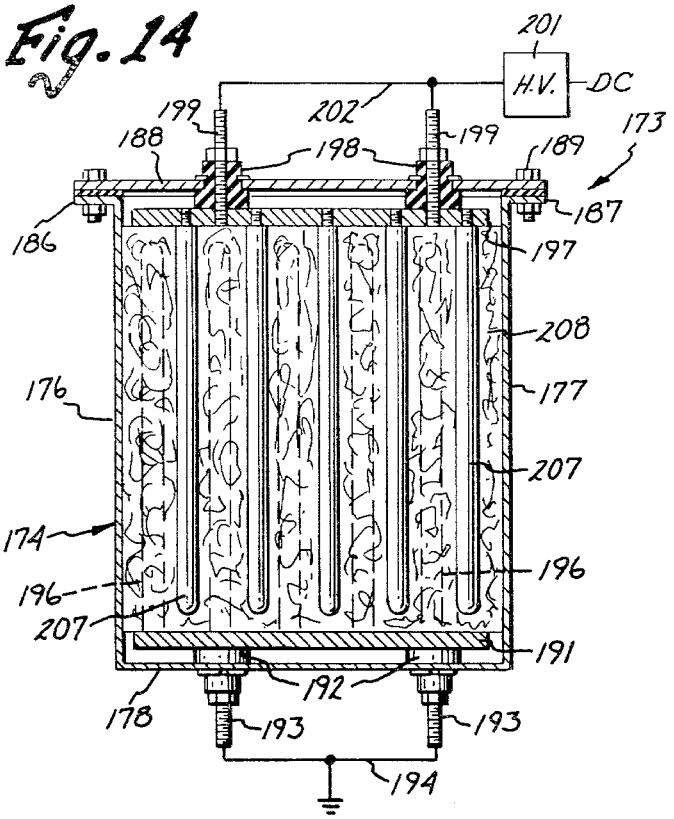
FIG. 14 is a sectional view taken along the line 14—14 of FIG. 12.

Referring to FIGS. 12, 13, and 14, there is shown a fourth modification of the particle collector indicated generally at 173 useable with engine 46 for reducing the amount of particulate matter discharged into the atmosphere. Collector 173 has an elongated box-like housing or casing 174 comprising upright side walls 176 and 177. Walls 176 and 177 are joined to a generally flat bottom wall 178, an inlet end wall 179, and an outlet end wall 182. Inlet end wall 179 is attached with a clamp 181 to the engine outlet pipe 49. Outlet end wall 182 is joined to an exhaust pipe 183 with a clamp 184. The walls 176-179 and 182 surround a particle collection and filtering chamber 185.

The top portions of side walls 176 and 177 have outwardly directed lips 186 and 187 supporting a cover 188. The cover 188 closes the top of chamber 185 and is attached to lips 186 and 187 with a plurality of fasteners 189, as nut and bolt assemblies. Other types of fasteners can be used to connect cover 188 to lips 186 and 187.

As shown in FIG. 14, a base or bottom plate 191 is supported on bottom wall 178 with a plurality of blocks 192. A plurality of bolts 193 extended through blocks 192 attach plate 191 to blocks 192 and bottom wall 178. A line 194 connects bolts 193 to ground. A plurality of rows of upright cylindrical electrodes or rods 196 having particle collecting surfaces are attached to plate 191. The number of rods in each row of rods varies according to the length of the housing 174. As shown in FIG. 13, rods 196 are equally spaced from each other and extend the full length of chamber 185. Five rows of rods 196 are illustrated in FIG. 13.

A second or top plate 197 is located in chamber 185 adjacent cover 188. A plurality of electrically insulative blocks 198 mount plate 197 on cover 188. Bolts 199 extended through blocks 198 are attached to plate 197 and a high voltage power supply 201 with a line 202. A high voltage power supply 201, similar to power supply 53, is coupled to D.C. power.

Figure 16:
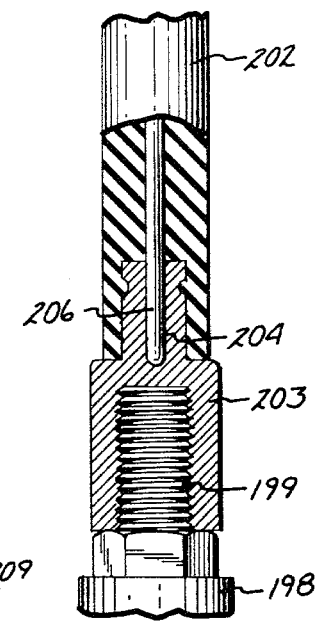
FIG. 16 is a side view, partly sectioned, of an electrical connector used to connect the collector to a power supply.

Referring to FIG. 16, there is shown a means for releasably connecting line 202 to bolt end 199. A connector or cap 203 is threaded onto upper end of bolt 199. Cap 203 has an end with a longitudinal bore 204. Line 202 has an elongated finger or terminal 206 that extends into bore 204. Other types of electrical connections can be used to releasably connect line 202 to the bolts 199.

A plurality of rows of downwardly directed cylindrical second electrodes or rods 207 having particle collecting surfaces are attached to top plate 197. As shown in FIG. 13, rods 207 are located in rows that are located between adjacent rows of the first rods 196. Each second rod 207 is equally spaced from an adjacent first rod 196 so that there is a substantially equal electric field established by the electrical potential difference between rods 196 and 207 throughout chamber 185.

Figure 15:
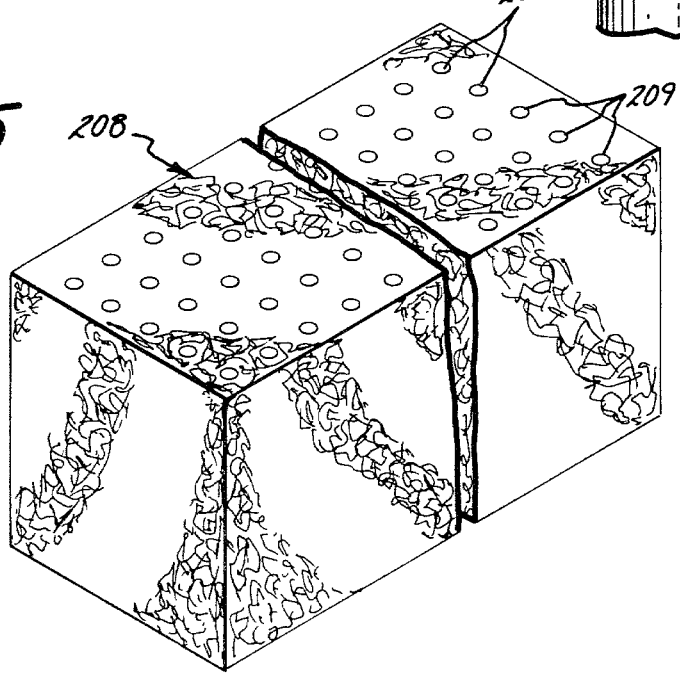
FIG. 15 is a foreshortened perspective view of the filter used in the collector of FIG. 12.

A filter element 208 is located in chamber 185. As shown in FIG. 15, filter element 188 has a plurality of vertical holes 209 for accommodating the rods 207. The bottom side of filter 208 has similar holes (not shown) for accommodating rods 196. Filter element 208 is a filament or fiber filter made of non-conductive filaments, such as plastic fibers. Other types of non-electrically conductive material can be used for filter element 208. Filter element 208 provides surfaces on which the particulate matter moving through chamber 185 can impinge and collect. Filter 208 is removable from chamber 185 for servicing and replacement. The top cover 188 is removed from housing 174. The filter element 208 is pulled upwardly through the open top of housing 174.

Particle collector 173 can be used as a static electric field precipitator with filter element located in chamber 185. Particles 51 and exhaust gas move through the inlet portion 185A of the chamber 185 and through the electric field established between rods 196 and 207 and the filter 208. The charged particles are collected on the filter fibers and surfaces of rods 196 and 207. Additional non-charged particles are collected on the filter filaments 208. The gas and particles that are not collected move through outlet section 185B of the chamber 185 into discharge pipe 183. Particle collector 173 can be used as a static electric field precipitator without filter element 208.

Figure 17:
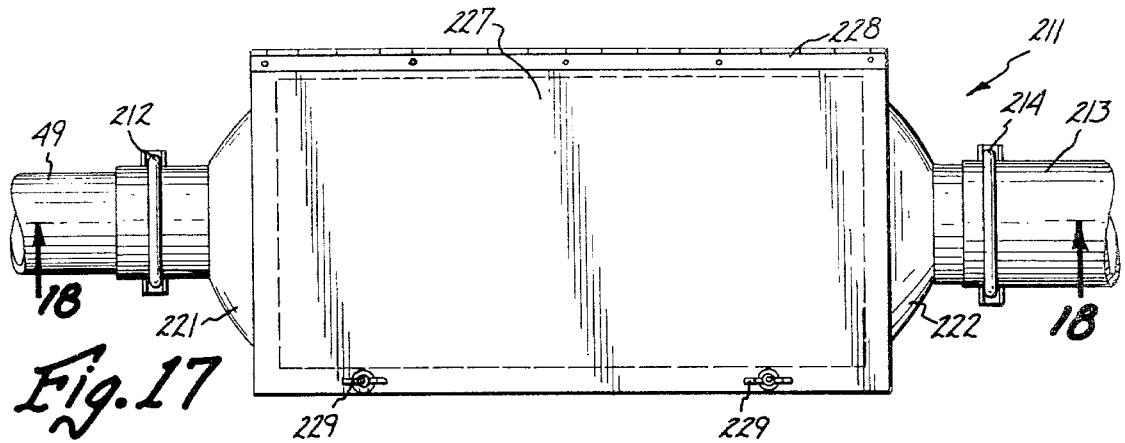
FIG. 17 is a top plan view of a fifth modification of a particle collector useable with the means employing the method and apparatus of the invention for reducing the amount of particles emitted by a combustion system into the atmosphere.
Figure 18:
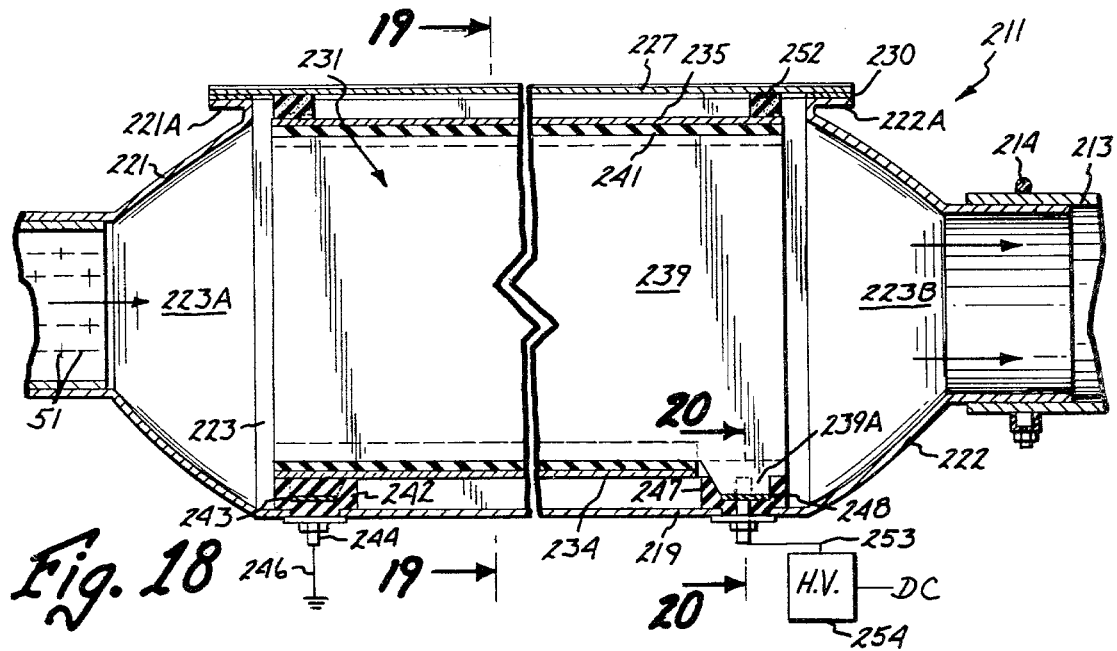
FIG. 18 is a foreshortened sectional view taken along the line 18—18 of FIG. 17.
Figure 19:
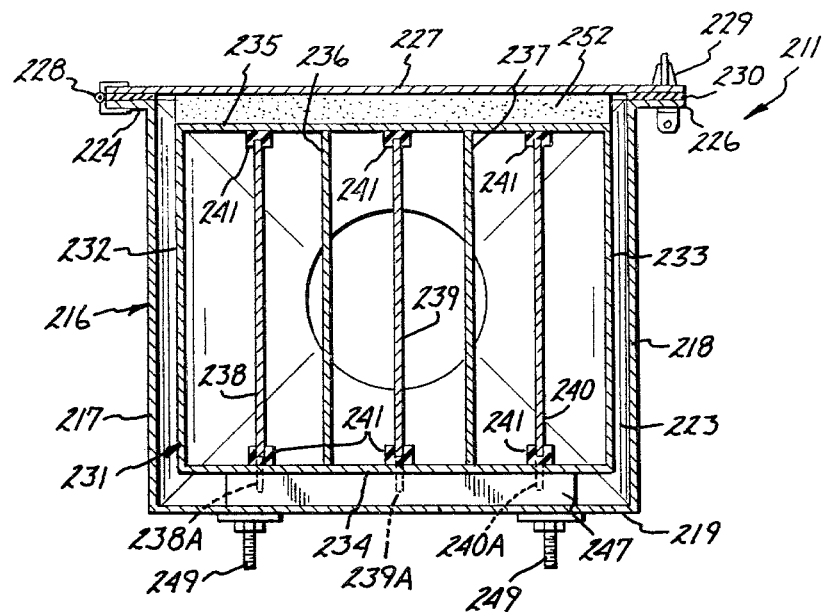
FIG. 19 is a sectional view taken along the line 19—19 of FIG. 18.

Referring to FIGS. 17, 18, and 19, there is shown a fifth modification of the particulate matter collector indicated generally at 211 used with engine 46. Collector 211 is attached to engine exhaust pipe 49 with a clamp 212 to receive the exhaust gases and particles discharged by the engine. The discharge end of collector 211 is attached to a pipe or tube 213 with a clamp 214. Collector 211 has an elongated generally box shaped housing or casing indicated at 216 surrounding a particle collection chamber 223. Housing 216 has a pair of upright elongated side walls 217 and 218 joined to a generally flat bottom wall 219. Walls 217–219 are connected to an inlet wall 221 surrounding the inlet portion 223A of chamber 223. The opposite end of housing 216 has an outlet end wall 222 surrounding the outlet section 223B of the chamber 223.

Referring to FIG. 19, the top portions of side walls 217 and 218 have outwardly directed lips 224 and 226 providing support for a cover or door 227. As shown in FIG. 18, end walls 221 and 222 are provided with top lips 221A and 222A, respectively, for receiving the ends of cover 227. Returning to FIGS. 17-19, an elongated piano type hinge 228 pivotally connects cover 227 to lip 224 allowing cover 227 to be pivoted or moved upwardly to an open position to provide access to chamber 223. A pair of releasable fasteners 229, as nut and bolt assemblies having wing nuts, releasably hold cover 227 in its closed position. Fasteners 229 are pivotally mounted on lip 226. Wing nuts clamp cover 227 onto lip 226. A generally flat seal 230 cooperates with lips 224, 226, 221A, and 222A, and the outer peripheral edge of cover 227 to prevent the escape of exhaust gases and particulate matter from chamber 223 through the top of housing 216.

Figure 21:
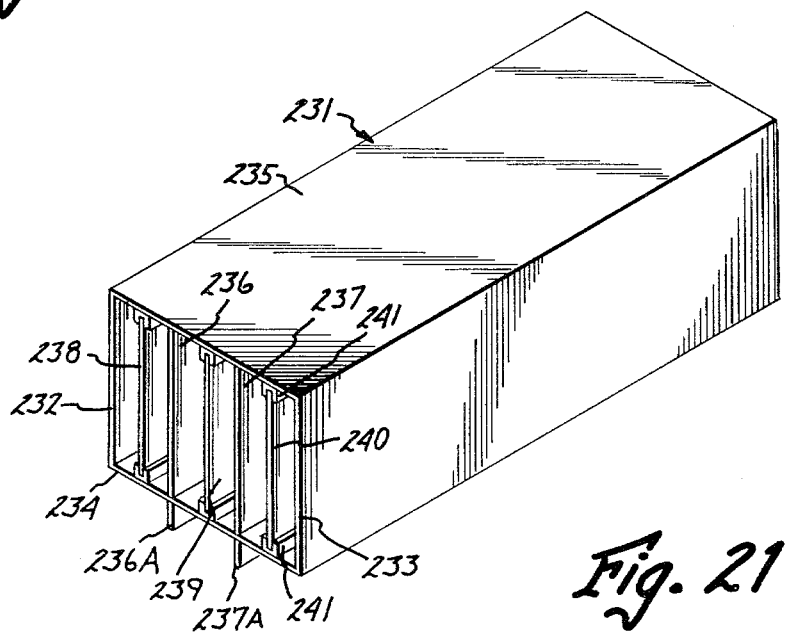
FIG. 21 is a perspective view of the replaceable collector cartridge used in the collector of FIG. 17.

A particle collecting cartridge indicated generally at 231 is located in chamber 223. The cartridge is a self-contained unit that can be removed from chamber 223 for servicing or replacement. Referring to FIGS. 19 and 21, cartridge 223 is an elongated tubular or box shaped unit having upright rectangular side walls 232 and 233 joined to bottom wall 234 and top wall 235. The ends of the cartridge are open so that exhaust gas and particles can flow through the cartridge. A pair of first electrodes or plates 236 and 237 having particle collecting surfaces are secured and extended between top wall 235 and bottom wall 234. Plates 236 and 237 extend the full length of top and bottom walls 235 and 234. Plates 236 and 237 divide the passage of the cartridge into three substantially equal passageways. Plates 236 and 237 have downwardly directed electrical connecting legs 236A and 237A, respectively. Walls 232, 233, 234, 235, and plates 236 and 237 are electrically conductive members, such as metal, electrically conductive ceramic, plastic members coated with electrically conductive materials, aluminum, and the like.

Three rectangular upright second electrodes or plates 238, 239, and 240 having particle collecting surfaces are located in the passages formed by the plates 236 and 237. Plates 238 and 239 are equally spaced from adjacent side walls 232 and 233 and plates 236 and 237 and extend the full length of the cartridge. Plates 238, 239, and 240 are electrical conductors, as sheet metal, stainless steel, aluminum, and the like. The upper and lower edges of plates 238, 239, and 240 are mounted in electrical insulator strips 241 secured to the bottom and top walls 234 and 235, respectively.

As shown in FIG. 18, the left end of cartridge 231 rests on a transverse support 242. Support 242 is an electrically insulative member having a conductor bar 243. Conductor bar 243 is electrically coupled to legs 236A and 237A with suitable connectors, such as U-clips. Bolts 244 extended through support 242 are connected to conductor bar 243 and a line 246 leading to ground.

Figure 20:
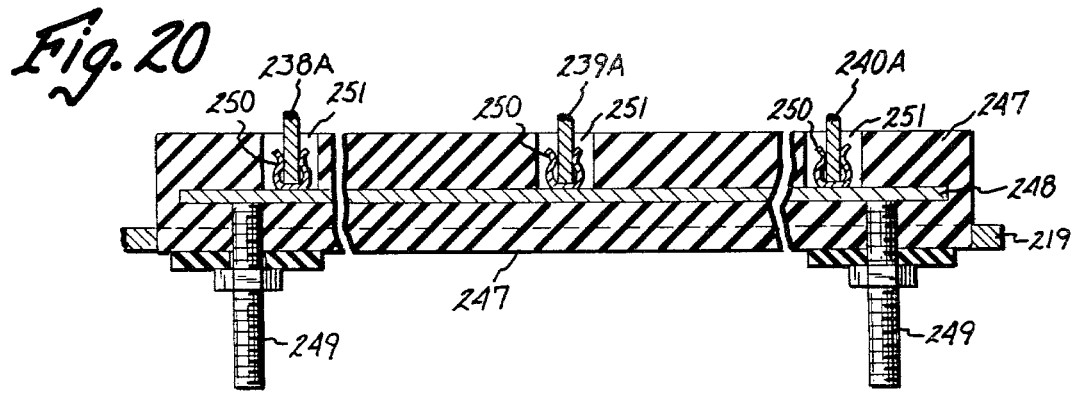
FIG. 20 is a foreshortened enlarged sectional view taken along the line 20—20 of FIG. 18.

The right end of cartridge 231 engages a transverse support 247. As shown in FIG. 20, support 247 is an electrically non-conductive material, such as plastic, carrying a conductor bar 248 attached to bolts 249. A U-shaped electrical connector or clips 250, located in recesses 251, are secured to the top of bar 248. Clips 250 engage opposite sides of the plate legs 238A, 239A, and 240A to electrically connect the plates 238, 239, and 240 to a high voltage power supply 254. As shown in FIG. 18, high voltage power supply 254 is connected to a line 253 leading to the bolts 249.

Cartridge 231 is held in engagement with the supports 242 and 247 with cover 227. A rectangular resilient cushion or pad 252 is interposed between cover 227 and top wall 235 of the cartridge. When cover 227 is in the closed position, pad 252 biases cartridge 231 in a downward direction thereby retaining connector legs 236A, 237A, 238A, 239A, and 240A in electrical connection with clips 250. The cartridge plates 236–240 can be provided with female or U-shaped electrical connectors. The male prongs or fingers can be mounted on plates 243 and 248 to provide for a releasable electrical connection between the cartridge 231 and plates 243 and 248.

In use, high voltage power supply 254, similar to power supply 53, supplies an electrical potential to plates 238, 239, and 240. This establishes an electrical field between plates 238, 239, and 240 and side walls 233 and 234 and first plates 236 and 237. The charged particles 51 flow through passages between adjacent plates and side walls. The charged particles, because of the electrical field, are deposited on the collecting surfaces of plates 236–240 and the inside of side walls 232 and 233. The exhaust gases and non-charged particles pass through the collector and are discharged to the catalytic converter, a secondary collecting device, or the atmosphere via discharge pipe 213. Plates 236–240 can be subjected to heat from the engine. This will oxidize the particles collected on the collecting surfaces of plates 236–240.

Cartridge 231 can be serviced by opening cover 227. Cartridge 231 is removed upwardly from chamber 233. A new cartridge can be readily inserted into the chamber and electrically connected to the bars 243 and 247. When cover 227 is closed, pad 252 holds cartridge 231 in an operative electrically connected position in chamber 223.

Referring to FIG. 22, there is shown a sixth modification of the particle matter collector indicated generally at 300 useable with engine 46 for reducing the amount of particles discharged into the atmosphere. Collector 300 is an elongated cylindrical structure that is connected to a high voltage power supply 301 with a line 302 and ground. The collector 300 has a cylindrical housing or casing 303 including at one end an inlet end wall 304. A short sleeve 306 is joined to the midsection of end wall 304 to accommodate the engine discharge or exhaust gas pipe or manifold structure. The opposite end of housing 303 has an outlet end wall 307 having a sleeve 308. Sleeve 308 has an outlet passage for the gases and materials discharged from collector 300. Housing 303 surrounds an elongated cylindrical chamber 309. First collector means 310 is located within chamber 309. First collector means 310 includes an elongated cylindrical rod 312 located generally along the longitudinal axis of chamber 309. Collector means 310 also includes one or more cylindrical sleeves 311 concentrically located about rod 312 and concentric relative to each other. A plurality of second particle collector means 313 are associated with the first collector means 310. The second collector means 313 are elongated cylindrical members concentrically located about the center rod 312 and cylindrical member 311. The second collector means 313 are interspersed alternately with the first collector means 311.

A plurality of rods or bolts 314 connect the first collector means 311 to ground. Insulator sleeves 316 disposed about the rods 314 electrically insulate the second connector means 313 from rods 314.

The opposite ends of the cylindrical collector means 311 and 313 are supported on a plurality of second rods 317. Rods 317 are in electrical connection with the second cylindrical collector means 313 and line 302 leading to the high voltage supply 301. Electrical insulator sleeves 318 insulate the rods 317 from first collector means 311 and rod 312. Other types of structure can be used to concentrically locate the first and second cylindrical collector means in a concentric alternate relation relative to each other in chamber 309. The cylindrical collector means 313 are spaced from each other and provide cylindrical passages 309A, 309B, 309C, and 309D. The number of passages can be changed by either increasing or decreasing the number of first and second cylindrical collector means that are located in chamber 309.

In use, high voltage power supply 301 supplies an electrical potential to the cylindrical collector means 311 and 313 and the center rod 312. This establishes an electrical field between adjacent cylindrical collector means and housing 303. The charged particles 51 move through the passages 309A–309D. The charged particles, because of the electric field, are deposited on the surfaces of the cylindrical collectors 311 and 313 and the inside of housing 303. The exhaust gases and non-charged particles pass through the chamber 309 and are discharged through sleeve 308. The particles moving through sleeve 308 can be directed to a catalytic converter, the atmosphere, or a centrifugal separator operable to remove the particles from the carrier gas. Sleeve 306 can be mounted in close proximity to the discharge manifold of engine 46. The hot gases emitted from the engine 46 will oxidize the collected particles on the cylindrical collector means 311 and 313. The oxidized particles are converted into a gas, as CO or $CO_2$, which is discharged from collector 300 via sleeve 308.

Referring to FIG. 25, there is shown a means indicated generally at 400 employing the method and apparatus of the invention for reducing particulate matter or particles emitted by a combustion means, as an internal combustion engine indicated generally at 401. Engine 401 is a diesel engine having a block 402 accommodating conventional pistons and a crank shaft connected to the pistons with connecting rods. Air supplied to the combustion chambers of the engine flows through an air intake unit 403 and an air intake manifold. Fuel injectors or nozzles 404 function to sequentially introduce hydrocarbon fuels, as diesel fuel, into the combustion chambers of engine 401. A pump 406 operates to deliver liquid fuel under pressure to the fuel injectors 404. Pump 406 is connected with a fuel supply line 407 and fuel return line 408 to a tank 410 for storing the diesel fuel. A valve 408A is in line 408 to control the flow of fuel therein back to tank 410. Engine 401 has an exhaust manifold 409 having a passage 411 for carrying the exhaust gases and charged particles 412 to a particle collector indicated generally at 413. The diesel engine exhaust particles 412 have the charge characteristics of the particles emitted by diesel engine 46 hereinbefore described.

Particle collector 413 can have the details of the particle collectors, as shown in FIGS. 3, 9, 18, and 23. The collector 413 is a static electric field precipitator powered by a high voltage power supply 414. Power supply 414 is coupled to a D.C. power source 416, as a vehicle 12-bolt battery. A line 417 connects power supply 414 to conductor connectors 418 of particle collector 413.

The discharge end of particle collector 413 has an outlet tube or sleeve 419 connected to a cyclone separator indicated generally at 421. Separator 421 is a collection device operable to remove the particles that flow from collector 413. Collector 413 operates to collect the particles on its particle collecting surfaces on the spaced electrodes in the collector 413. The electrodes can be spaced plates, rods, or cylindrical members, as shown in FIGS. 3, 9, 19, and 23. The particles, as they are collected, build up on the surfaces. In time, the buildup of particles on the surfaces will fracture or break loose and re-entrain in the gas moving through collector 413. The re-entrained particles are much larger in size than the sub-micron charged particles originally formed in the diesel engine combustion chamber. Vibrators, mechanical devices, and means to remove particles from the particle collection surfaces can be used to clear particles from the particle collection surfaces. The large particles are readily removed from the exhaust gases by cyclone separator 421. Other types of particle separating devices can be used in lieu of cyclone separator 421.

A cyclone separator, as shown in FIGS. 25, 26, and 27, has a tubular body 422 surrounding a separation chamber 423. An inlet means or manifold 424 is joined to one side of body 422 providing a tangential inlet passage 426 that extends generally tangential to cylindrical chamber 423. A discharge tube or sleeve 427 secured to the top or end wall of body 422 extends into chamber 423. Sleeve 427 has an outlet passage leading to the atmosphere for carrying exhaust gases. The outlet passage has an open end 429 that is located in approximate mid-section of chamber 423. The lower end of body 422 has a particle exit opening 431 surrounded by a downwardly tapered or cone-shaped bottom 432. A baffle 433 is located in chamber 423 above exit opening 431. Baffle 433 has a slight convex or disc shape and is spaced from the inside wall of body 422 providing an annular passage for movement of the separated particles to exit opening 431. The exhaust gas and particles carried by the gas enter the upper portion of chamber 423 and move in a spiral flow of main vortex downward between the walls of sleeve 427 and body 422 toward bottom baffle 433. The flow then reverses its direction forming a vortex core which travels to the gas outlet passage 428. Inertial separating forces acting on the particles cause the particles to move to exit opening 431.

As shown in FIG. 25, a particle transfer means indicated generally at 434 receives particles from cyclone separator 421 and dispenses the particles into the fuel flowing in line 407 to pump 406. Particle transfer means has a fuel and particle mixing unit 436 connected to a particle inlet tube 437 leading to particle exit opening 431 of separator 421. A fuel inlet tube 438 connects mixing unit 436 with fuel line 407. A pump 439 driven by an electric motor is connected to line 438 and moves fuel through line 438 into unit 436. A fuel outlet tube 440 connects the outlet end of mixing unit 436 to fuel line 407. Lines 438 and 440 connect the mixing unit 436 in parallel relation with fuel line 407 and do not interfere with the flow of fuel in line 407. The level of fuel in mixing unit 436 is controllled with a pipe extended up into unit 436. Other types of fuel level controls can be used to regulate the level of fuel in units 436.

As shown in FIGS. 28 and 29, fuel and particle mixing unit 436 has a housing 443 having a mixing chamber 444 where particles are mixed with fuel to form a colloidal suspension. A first connector 446, as shown in FIG. 28, connects the particle inlet tube 437 to the top of housing 443. A second connector 447 connects fuel inlet tube 438 to housing 443. A third connector 448 connects fuel outlet tube 440 to the end of housing 443. Outlet tube 440 can be connected to fuel tank 408 so that the fuel particle mixture is delivered back to the tank and mixed with the fuel therein. Inlet tube 438 can be connected to a return fuel line 408 connecting pump 406 to tank 408 so that pump 406 moves fuel through chamber 444 and back to tank 408.

A mixing assembly indicated generally at 449 is located within chamber 444 for mixing the particles directed into chamber 444 with the fuel flowing through chamber 444. Mixing assembly 449 has a body 451 having an end 452 located in and closing the open end of chamber 444. Nut and bolt assemblies 453 secure body 451 to housing 443. A rotatable member 454 is rotatably mounted in end 453. A helical mixing means 456, shown as a coil or helical rod, is located in chamber 444 and connected to rotatable member 454. A motor 457 drives rotatable member 454 thereby turning mixing means to mix the particles with the fuel flowing in chamber 444. Motor 457 can be an electric motor connected to the electrical system of a vehicle. Motor 457 can be connected to the ignition switch of the vehicle so that it operates when the ignition switch is on. Motor 457 can be a fluid motor operable in response to the flow of the fluid in fuel line 407 or a source of fluid under pressure, as oil pressure. A cap 458 retains motor 457 on body 451. A line 459 connected to housing 443 is open to chamber 444 to carry air from an air pressure source 461 to chamber 444. The air moves through chamber 444 and into cyclone separator 421.

In use, diesel engine 401 in operation discharges gas and particulates to exhaust manifold 407. The particles, including charged particles, are directed to the particle collector 413. The electrostatic field established in collector 413 by the electrodes separate the charged particles from the gases. The charged particles collect on the electrodes and agglomerate or form into larger particles. The larger particles, in use, are re-entrained with the gas and carried to separator 421. Vibrators or mechanical devices can be used to facilitate removal of collected particles from the electrodes of collector 413.

Separator 421 functions to separate the larger particles from the exhaust gas and discharge the gas to the atmosphere. The separated particles flow from separator 421 through particle inlet tube 437 to particle transfer means 434. The particles flow into chamber 444 and are mixed with the fuel flowing through chamber 444 to form a colloidal suspension. The rotating helical means 456 mechanically mixes the particles with the fuel. Pump 439 continuously supplies fuel to chamber 444 so that the mixing of particles with the fuel is a continuous process. Pump 439 can be turned on and off to intermittently mix particles with fuel or provide a batch process. The particles are entrained with the fuel and flow back into fuel line 407. The particles being relatively small do not interfere with the operation of pump 406, nor the fuel injectors 404. The fuel injectors 404 inject the fuel and particles back into the combustion chambers where the combustion process is repeated.

Referring to FIG. 30, there is diagrammatically shown a means indicated generally at 500 employing the method and apparatus of the invention for reducing particulate matter or particles emitted by combustion means, as an internal combustion engine. The engine is a diesel engine, as diagrammatically shown in FIG. 25 at 401. The diesel engine in connected to a particle collector, such as a particle collector shown in FIGS. 3, 9, 18, and 23. The discharge end of the particle collector is connected with a sleeve 502 to a means to separate particles from the gas, such as cyclone separator 501. Separator 501 is a particle collection device operable to remove particles that flow with the gas from the collector. Cyclone spearator 501 has a gas outlet tube 503 and a particle outlet tube 504.

A particle transfer means indicated generally at 506 is connected to tube 504 to receive the particles from separator 501. Particle transfer means 506 has a housing 507 having a chamber 508. Diesel fuel 509 located in chamber 508 is mixed with particles flowing or dispensed therein from separator 501. A rotatable paddle or wheel 511 driven by motor 512 mechanically circulates the fuel in chamber 508 and mixes the particles with the fuel to form a colloidal suspension.

A first pump 513 connected to an inlet line 514 operates to deliver fuel from a fuel tank 516 to chamber 508. Pump 513 can be driven by an electric motor connected to the electrical system of the vehicle. A second pump 517 connected in the return line 518 operates to pump fuel from chamber 508 back to tank 516. Line 518 is connected to an upright fuel leveling pipe 519 that operates to regulate the level of the fuel in chamber 508. Other types of fuel leveling devices can be used to maintain a supply of fuel in chamber 508. Fuel lines 514 and 518 are connected directly to tank 516. Particle transfer means 506 is not connected to fuel lines 521 and 522. Main fuel supply line 521 and fuel return line 522 are connected to the pump used to supply fuel under pressure to the fuel injectors of the engine. The particles mixed with the fuel in chamber 508 are delivered back to the tank 516 and mixed with the fuel therein. In some structural arrangements, separator 501 can be located above tank 516 so that the particles from the separator are dispensed directly into the fuel in the tank. The particles are carried by the fuel supply line 521 to the pump connected to the fuel injectors of the engine.

While there has been shown and described the preferred embodiments of the apparatus employing the method for reducing the amount of particles released by a combustion system, including a diesel engine, it is understood that changes in the structure, including the particle collector, power supply, materials, and sizes of the parts can be made by those skilled in the art without departing from the invention. The invention is defined in the following claims.

The embodiments of the invention in which an exclusive property or privilege is claimed are defined as follows:

1. An apparatus for reducing the amount of particles discharged into the atmosphere comprising: first means having at least one combustion chamber for receiving hydrocarbon fuel and air and accommodating combustion of the fuel and air, said combustion imparting electrical charges on at least some of, the particles formed during the combustion of the fuel and air, during said imparting of electrical charges on the particles a substantially equal number of particles are positively charged and negatively charged whereby the particles as a whole are a substantially electrically neutral mass of particles, particle collecting means for collecting at least some of the charged particles, second means for directing the charged particles from the combustion chamber directly to the particle collecting means without subjecting the charged particles to a charging step with an intermediate particle charging means whereby the electrical charges on the particles remain substantially the same, means associated with the particle collecting means to establish an electric field whereby at least some of the charged particles moving into the electric field are collected on the collecting means, particle separating means coupled to the particle collecting means operable to collect the collected particles that separate from the particle collecting means, and means for receiving particles from the particle separating means and dispensing the particles into the fuel.

2. The apparatus of claim 1 wherein: said first means is a diesel engine having a plurality of combustion chambers.

3. The apparatus of claim 1 wherein: the particle collecting means has first particle collecting elements and second particle collecting elements, and high voltage means connected to the first particle collecting elements to provide an electric field between the first and second particle collecting elements, said charged particles being collected on the collecting elements, and said collected particles separating as large particles from the collecting elements.

4. The apparatus of claim 1 wherein: the particle separating means is a cyclone separator having an inlet passage for carrying gas and particles from the particle collecting means into the separator, first outlet for carrying gas from the separator, and a second outlet for carrying particles from the separator, and means associated with the second outlet to direct particles to the means for receiving particles from the particle separating means and dispensing particles into the fuel.

5. The apparatus of claim 1 wherein: the means for receiving particles from the particle collecting means includes a particle transfer means having means for mixing particles with the fuel.

6. The apparatus of claim 5 wherein: the particle transfer means includes a housing having a chamber, first means for dispensing particles into the chamber, second means allowing fuel to flow through said chamber, and means in said chamber operable to mix the particles with the fuel in said chamber.

7. The apparatus of claim 6 wherein: the means in said chamber operable to mix the particles with the fuel includes a movable member, and means to move said movable member.

8. The apparatus of claim 7 wherein: the movable member is a coil member, and the means to move said movable member is a motor cooperating with the coil member to rotate said coil member.

9. An apparatus for reducing the amount of particles discharged into the atmosphere comprising: a diesel engine having a combustion chamber for receiving hydrocarbon fuel and air and accommodating combustion of the fuel and air, said combustion forming a substantial number of particles which are positively charged and negatively charged whereby the particles as a whole are a substantially electrically neutral mass of particles, a particle collector having particle collecting means for collecting the charged particles, means for directing the charged particles from the diesel engine directly to the particle collecting means without subjecting the charged particles to a charging step with an intermediate particle charging means whereby the electrical charges on the particles remain substantially the same, means associated with the particle collecting means to establish an electric field whereby the charged particles moving into the electric field are collected on the collecting means, particle separating means coupled to the particle collecting means operable to collect the collected particles that separate from the particle collecting means, and means for receiving particles from the particle separating means and dispensing particles into the fuel for the diesel engine.

10. The apparatus of claim 9 wherein: the particle collecting means has first particle collecting elements and second particle collecting elements, and high voltage means connected to the first particle collecting elements to provide an electric field between the first and second particle collecting elements, said charged particles being collected on the collecting elements, and said collected particles separating as large particles from the collecting elements.

11. The apparatus of claim 9 wherein: the particle separating means is a cyclone separator having an inlet passage for carrying gas and particles from the particle collecting means into the separator, first outlet for carrying gas from the separator, and a second outlet for carrying particles from the separator, and means associated with the second outlet to direct particles to the means for receiving particles from the particle separating means and dispensing particles into the fuel.

12. The apparatus of claim 9 wherein: the means for receiving particles from the particle collecting means includes a particle transfer means having means for mixing particles with the fuel.

13. The apparatus of claim 12 wherein: the particle transfer means includes a housing having a chamber, first means for dispensing particles into the chamber, second means allowing fuel to flow through said chamber, and means in said chamber operable to mix the particles with the fuel in said chamber.

14. The apparatus of claim 13 wherein: the means in said chamber operable to mix the particles with the fuel includes a movalbe member, and means to move said movable member.

15. The apparatus of claim 14 wherein: the movable member is a coil member, and the means to move said movable member is a motor cooperating with the coil member to rotate said coil member.

16. An apparatus useable with a diesel engine for reducing the amount of particles discharged into the atmosphere by the diesel engine, said diesel engine having combustion chamber means for receiving hydrocarbon fuel and air and accommodating combustion of the fuel and air, said combustion forming a substantial number of particles which are positively charged and negatively charged whereby the particles as a whole are a substantially electrically neutral mass of particles, comprising: particle collecting means for collecting the charged particles, means for directing the charged particles from the diesel engine directly to the particle collecting means without subjecting the charged particles to a charging step with an intermediate particle charging means whereby the electrical charges on the particles remain substantially the same, means associated with the particle collecting means to establish an electric field whereby the charged particles moving into the electric field are collected on the collecting means, particle separating means coupled to the particle collecting means operable to collect the collected particles that separate from the particle collecting means, and means for receiving particles from the particle separating means and dispensing particles into the fuel for the diesel engine.

17. The apparatus of claim 16 wherein: the particle collecting means has first particle collecting elements and second particle collecting elements, and high voltage means connected to the first particle collecting elements to provide an electric field between the first and second particle collecting elements, said charged particles being collected on the collecting elements, and said collected particles separating as large particles from the collecting elements.

18. The apparatus of claim 16 wherein: the particle separating means is a cyclone separator having an inlet passage for carrying gas and particles from the particle collecting means into the separator, first outlet for carrying gas from the separator, and a second outlet for carrying particles from the separator, and means associated with the second outlet to direct particles to the means for receiving particles from the particle separating means and dispensing particles into the fuel.

19. The apparatus of claim 16 wherein: the means for receiving particles from the particle collecting means includes a particle transfer means having means for mixing particles with the fuel.

20. The apparatus of claim 19 wherein: the particle transfer means includes a housing having a chamber, first means for dispensing particles into the chamber, second means allowing fuel to flow through said chamber, and means in said chamber operable to mix the particles with the fuel in said chamber.

21. The apparatus of claim 20 wherein: the means in said chamber operable to mix the particles with the fuel includes a movable member, and means to move said movable member.

22. The apparatus of claim 21 wherein: the movable member is a coil member, and the means to move said movable member is a motor cooperating with the coil member to rotate said coil member.

23. The apparatus of claim 20 including: pump means for moving fuel into the chamber.

24. The apparatus of claim 23 including: means for connecting the pump means to a tank for storing fuel for the engine.

25. The apparatus of claim 24 including: means connected to the housing and tank for carrying fuel and particles mixed therewith from the chamber to the tank.

26. The apparatus of claim 23 including: means for connecting the pump means to a fuel line connected to a tank storing fuel for the engine.

* * * * *

UNITED STATES PATENT AND TRADEMARK OFFICE
CERTIFICATE OF CORRECTION

PATENT NO. : 4,316,360
DATED : February 23, 1982
INVENTOR(S) : Benjamin Y. H. Liu et al.

It is certified that error appears in the above-identified patent and that said Letters Patent are hereby corrected as shown below:

Column 2, line 64, "bipolar" should be -- bi-polar --.

Column 17, line 13, "in" should be -- is --.

Column 18, line 2, "some" should be -- one --.

Signed and Sealed this

Twenty-fourth Day of August 1982

|SEAL|

Attest:

GERALD J. MOSSINGHOFF

Attesting Officer    Commissioner of Patents and Trademarks